United States Patent
Georgeson et al.

(10) Patent No.: US 11,007,635 B2
(45) Date of Patent: May 18, 2021

(54) GRAVITY COMPENSATION FOR SELF-PROPELLED ROBOTIC VEHICLES CRAWLING ON NON-LEVEL SURFACES

(71) Applicant: The Boeing Company, Chicago, IL (US)

(72) Inventors: Gary E. Georgeson, Tacoma, WA (US); James J. Troy, Issaquah, WA (US); Scott W. Lea, Renton, WA (US)

(73) Assignee: The Boeing Company, Chicago, IL (US)

( * ) Notice: Subject to any disclaimer, the term of this patent is extended or adjusted under 35 U.S.C. 154(b) by 380 days.

(21) Appl. No.: 16/044,651

(22) Filed: Jul. 25, 2018

(65) Prior Publication Data
US 2020/0030962 A1    Jan. 30, 2020

(51) Int. Cl.
| | | |
|---|---|---|
| *B25J 5/00* | (2006.01) | |
| *B64F 5/30* | (2017.01) | |
| *B08B 1/00* | (2006.01) | |
| *B08B 5/04* | (2006.01) | |
| *B25J 11/00* | (2006.01) | |

(Continued)

(52) U.S. Cl.
CPC .............. *B25J 5/007* (2013.01); *B08B 1/008* (2013.01); *B08B 5/04* (2013.01); *B25J 11/0085* (2013.01); *B25J 19/023* (2013.01); *B62D 57/024* (2013.01); *B64F 5/30* (2017.01)

(58) Field of Classification Search
CPC ... B08B 5/04; B08B 1/008; B64F 5/60; B64F 5/30; B65D 57/024; B65D 55/075; B65D 55/265; G01N 29/225; G01N 29/265; G01N 2291/2694; G01N 2291/2634; G01M 5/0016

See application file for complete search history.

(56) References Cited

U.S. PATENT DOCUMENTS

| | | |
|---|---|---|
| 3,789,947 A | 2/1974 | Blumrich |
| 4,146,967 A | 4/1979 | Rohner et al. |

(Continued)

FOREIGN PATENT DOCUMENTS

| | | | |
|---|---|---|---|
| EP | 2390066 A2 | 11/2011 | |
| WO | WO-9426540 A1 * | 11/1994 | ........... B62D 55/265 |

(Continued)

OTHER PUBLICATIONS

Extended European Search Report dated Dec. 12, 2019 in European Patent Application No. 19178743.1 (European counterpart of the instant U.S. patent application).

*Primary Examiner* — Steve Clemmons
(74) *Attorney, Agent, or Firm* — Ostrager Chong Flaherty & Broitman P.C.

(57) ABSTRACT

Apparatus and methods for providing gravity compensation to a cable-suspended, vacuum-adhered, tool-equipped crawler vehicle traveling along and following the contour of a non-level surface during the execution of an automated maintenance operation. One technical feature shared by multiple embodiments of the gravity-compensating systems is that a cable spool is operated to wind a portion of the cable from which the vacuum-adhered crawler vehicle is suspended to generate a tensile force that counteracts a gravitational force being exerted on the crawler vehicle during movement. Rotation of the cable spool may be driven by a motor or by a tensioning spring.

21 Claims, 26 Drawing Sheets

(51) Int. Cl.
*B25J 19/02* (2006.01)
*B62D 57/024* (2006.01)

(56) References Cited

U.S. PATENT DOCUMENTS

| | | | |
|---|---|---|---|
| 4,785,902 A * | 11/1988 | Ochiai | B62D 57/00 180/164 |
| 4,926,957 A * | 5/1990 | Urakami | B62D 57/024 114/222 |
| 4,971,591 A * | 11/1990 | Raviv | A63H 17/26 180/164 |
| 5,031,458 A | 7/1991 | Young et al. | |
| 5,240,503 A * | 8/1993 | Levy | A47L 1/02 118/323 |
| 5,440,476 A * | 8/1995 | Lefkowitz | G05B 19/251 212/76 |
| 5,536,199 A * | 7/1996 | Urakami | B62D 57/00 15/98 |
| 5,623,107 A | 4/1997 | Patterson, Sr. et al. | |
| 5,698,787 A | 12/1997 | Parzuchowski et al. | |
| 5,730,646 A * | 3/1998 | Watkin | B24C 3/062 451/2 |
| 5,752,577 A * | 5/1998 | Urakami | B62D 57/00 180/164 |
| 6,102,145 A * | 8/2000 | Fisher | B08B 3/024 180/164 |
| 6,167,760 B1 | 1/2001 | Brunty et al. | |
| 6,220,099 B1 | 4/2001 | Marti et al. | |
| 6,378,387 B1 | 4/2002 | Froom | |
| 6,742,617 B2 * | 6/2004 | Jeswine | B62D 57/024 180/164 |
| 6,829,959 B2 | 12/2004 | Gifford et al. | |
| 6,964,312 B2 * | 11/2005 | Maggio | B62D 49/0635 15/340.1 |
| 7,083,383 B2 | 8/2006 | Loftus et al. | |
| 7,155,307 B2 * | 12/2006 | Seemann | B62D 55/00 700/245 |
| 7,231,826 B2 | 6/2007 | Bossi et al. | |
| 7,240,556 B2 | 7/2007 | Georgeson et al. | |
| 7,315,609 B2 | 1/2008 | Safai et al. | |
| 7,337,673 B2 | 3/2008 | Kennedy et al. | |
| 7,562,593 B2 | 7/2009 | Engelbart et al. | |
| 7,626,383 B1 | 12/2009 | Sun et al. | |
| 7,640,811 B2 | 1/2010 | Kennedy et al. | |
| 7,643,893 B2 | 1/2010 | Troy et al. | |
| 7,665,173 B2 * | 2/2010 | Simonette | A47L 1/02 15/50.3 |
| 7,716,989 B2 | 5/2010 | Kollgaard | |
| 8,060,270 B2 | 11/2011 | Vian et al. | |
| 8,199,194 B2 | 6/2012 | Troy et al. | |
| 8,347,746 B2 | 1/2013 | Hafenrichter et al. | |
| 8,434,504 B2 * | 5/2013 | Simonette | A47L 1/02 134/172 |
| 8,464,815 B2 * | 6/2013 | Niederberger | B62D 55/265 180/8.6 |
| 8,483,356 B2 | 7/2013 | Bendahan | |
| 8,713,998 B2 * | 5/2014 | Troy | G01N 27/00 73/104 |
| 8,738,226 B2 * | 5/2014 | Troy | B62D 57/024 701/36 |
| 8,743,196 B2 | 6/2014 | Fritz et al. | |
| 8,807,257 B1 | 8/2014 | Hansen et al. | |
| 8,874,371 B2 | 10/2014 | Troy et al. | |
| 8,892,252 B1 | 11/2014 | Troy et al. | |
| 9,043,146 B2 * | 5/2015 | Troy | G01S 17/46 701/519 |
| 9,156,321 B2 | 10/2015 | Troy et al. | |
| 9,221,506 B1 * | 12/2015 | Georgeson | G05D 1/00 |
| 9,302,787 B2 | 4/2016 | Hafenrichter et al. | |
| 9,410,659 B2 * | 8/2016 | Troy | G05D 1/0276 |
| 9,470,658 B2 | 10/2016 | Troy et al. | |
| 9,481,082 B1 | 11/2016 | Hafenrichter et al. | |
| 9,533,724 B2 * | 1/2017 | Troy | B62D 55/265 |
| 9,574,549 B2 | 2/2017 | Lee et al. | |
| 9,643,313 B2 | 5/2017 | Hafenrichter et al. | |
| 9,681,784 B2 * | 6/2017 | Lange | A47L 1/02 |
| 9,688,326 B2 * | 6/2017 | Xiao | B62D 55/265 |
| 9,738,335 B2 * | 8/2017 | Davies | B62D 57/024 |
| 9,969,131 B2 | 5/2018 | Samak Sangari et al. | |
| 10,518,830 B2 * | 12/2019 | Beard, III | B62D 57/024 |
| 10,532,781 B2 * | 1/2020 | Xiao | A47L 11/40 |
| 10,811,150 B2 * | 10/2020 | Vigliano | G21C 17/01 |
| 2002/0036108 A1 | 3/2002 | Jeswine et al. | |
| 2003/0147493 A1 | 8/2003 | Bueno et al. | |
| 2006/0043303 A1 | 3/2006 | Safai et al. | |
| 2006/0048800 A1 * | 3/2006 | Rast | H02S 10/40 134/56 R |
| 2006/0055396 A1 | 3/2006 | Georgeson et al. | |
| 2007/0096727 A1 | 5/2007 | Rempt et al. | |
| 2009/0038398 A1 | 2/2009 | Lavoie et al. | |
| 2010/0011864 A1 | 1/2010 | Hanan et al. | |
| 2010/0132137 A1 | 6/2010 | Eggleston et al. | |
| 2011/0178727 A1 | 7/2011 | Hafenrichter et al. | |
| 2012/0014759 A1 | 1/2012 | Sarh et al. | |
| 2012/0060611 A1 | 3/2012 | Thommen-Stamenkov et al. | |
| 2012/0153032 A1 | 6/2012 | Svanebjerg et al. | |
| 2013/0024067 A1 | 1/2013 | Troy et al. | |
| 2013/0261876 A1 | 10/2013 | Froom et al. | |
| 2013/0289766 A1 | 10/2013 | Hafenrichter et al. | |
| 2013/0298682 A1 | 11/2013 | Motzer et al. | |
| 2013/0304251 A1 | 11/2013 | Garvey et al. | |
| 2014/0182479 A1 | 7/2014 | Hafenrichter et al. | |
| 2019/0320859 A1 * | 10/2019 | Bofill | E04G 23/002 |
| 2020/0025176 A1 * | 1/2020 | Georgeson | G01N 29/225 |
| 2020/0080911 A1 * | 3/2020 | Hafenrichter | B60B 19/003 |

FOREIGN PATENT DOCUMENTS

| | | | | |
|---|---|---|---|---|
| WO | | 2011107087 A2 | 9/2011 | |
| WO | WO-2019040975 A1 * | | 3/2019 | E04G 23/002 |

* cited by examiner

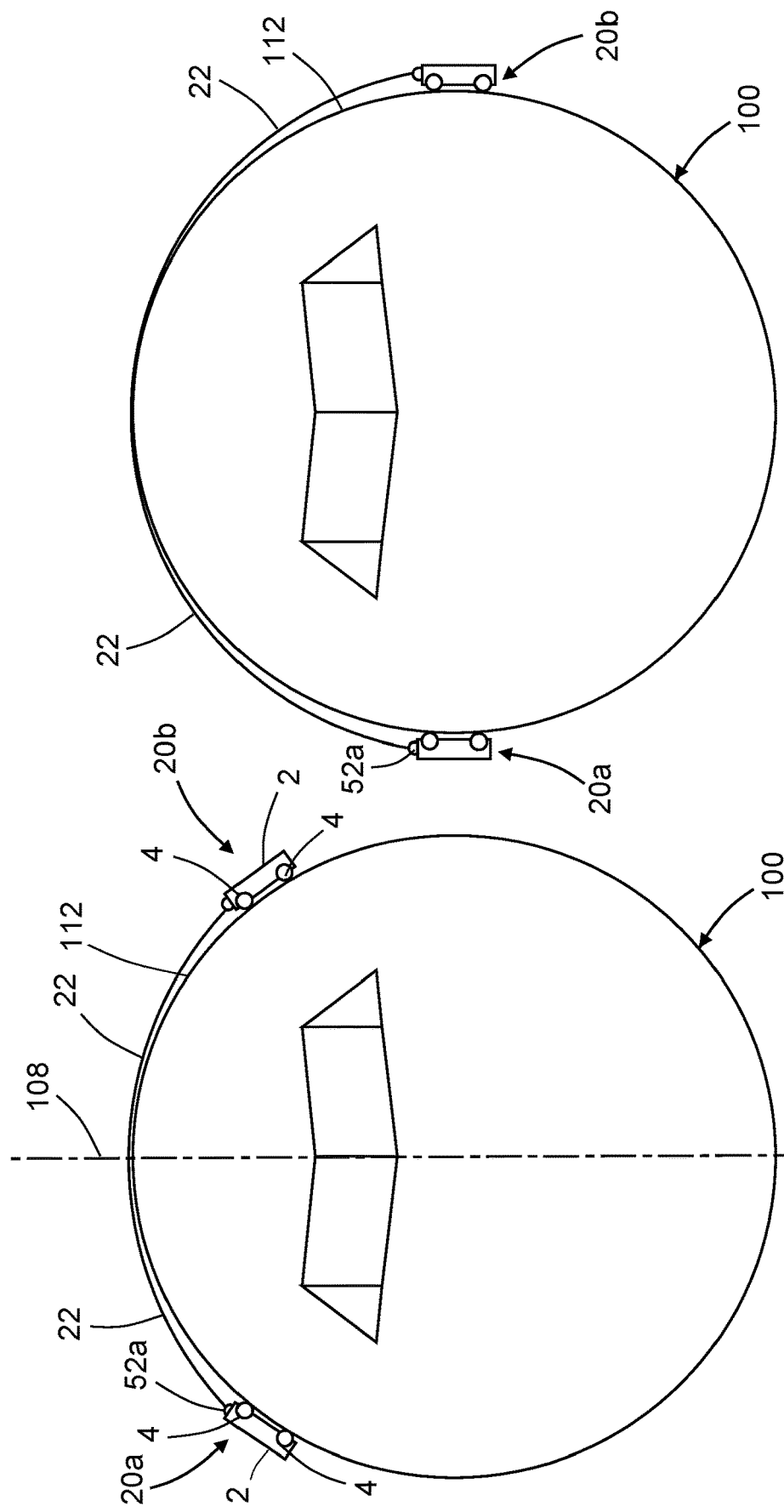

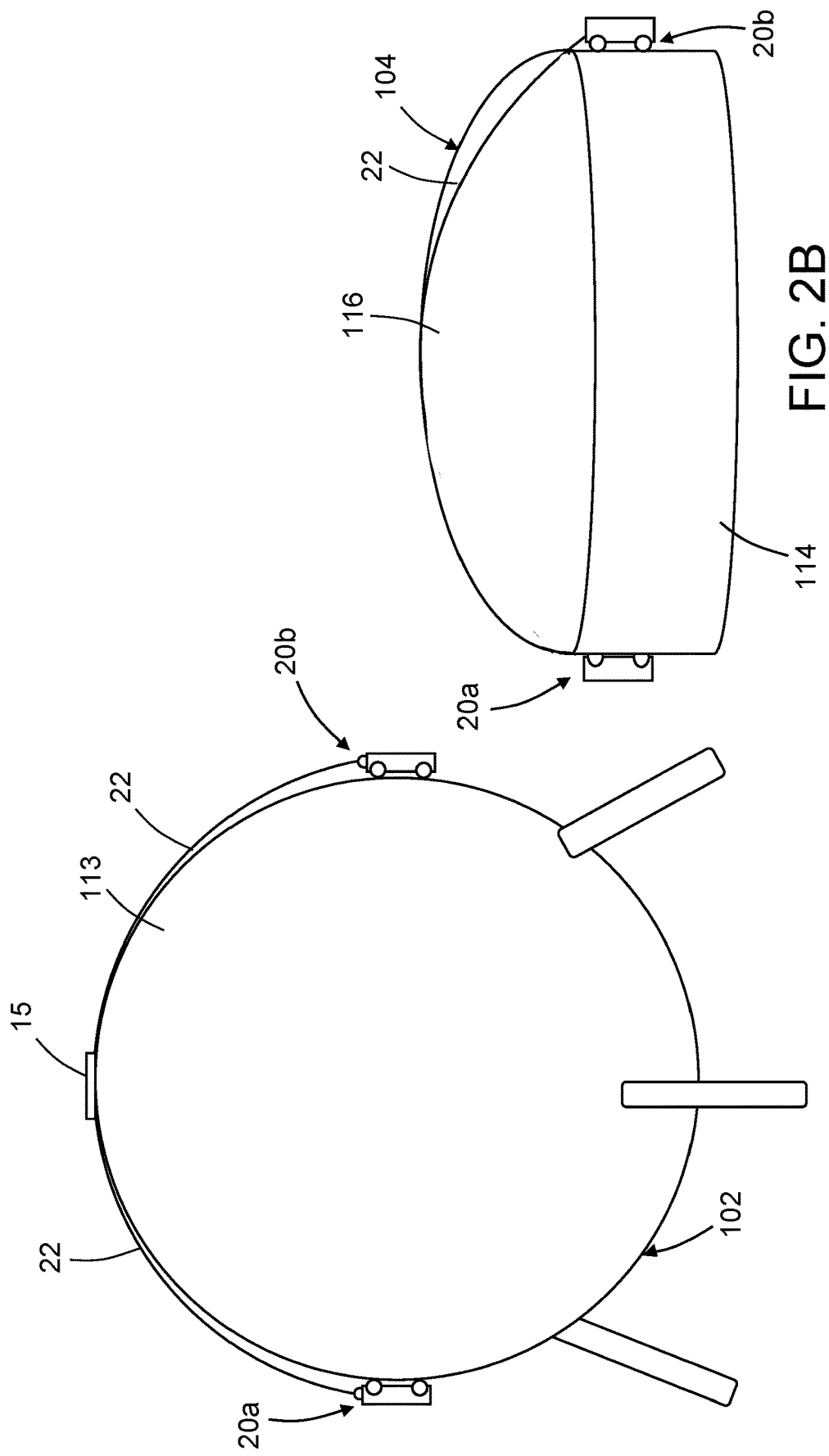

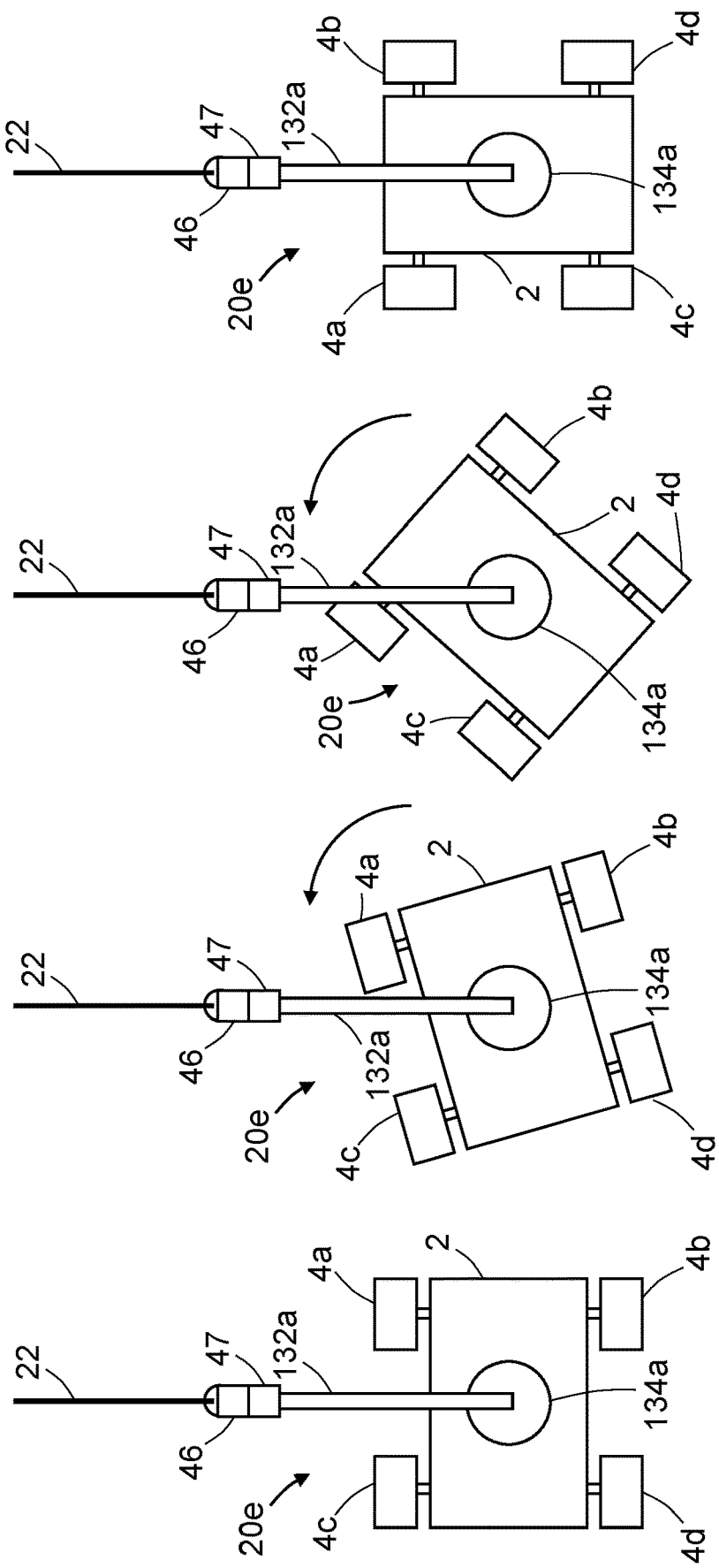

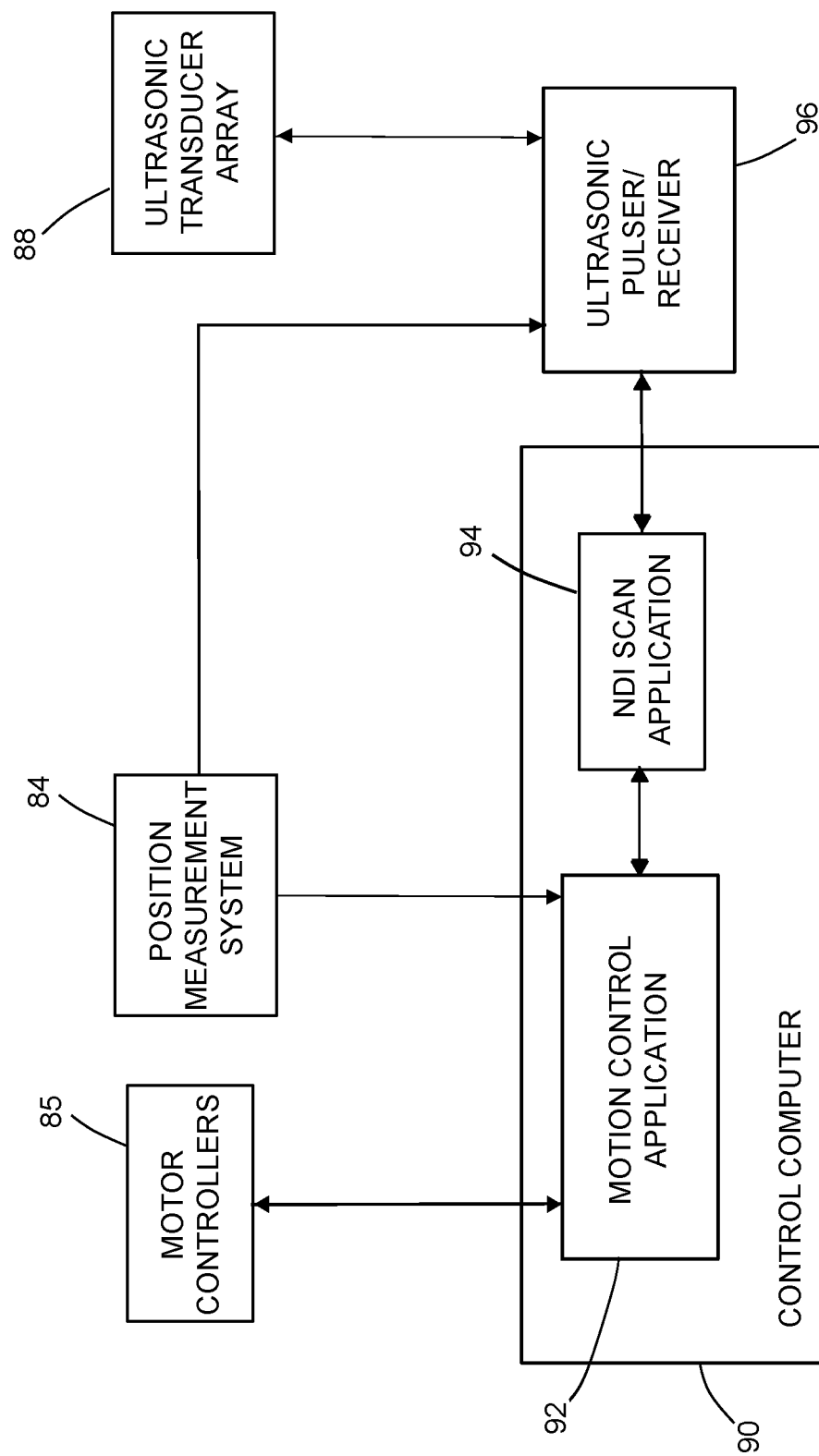

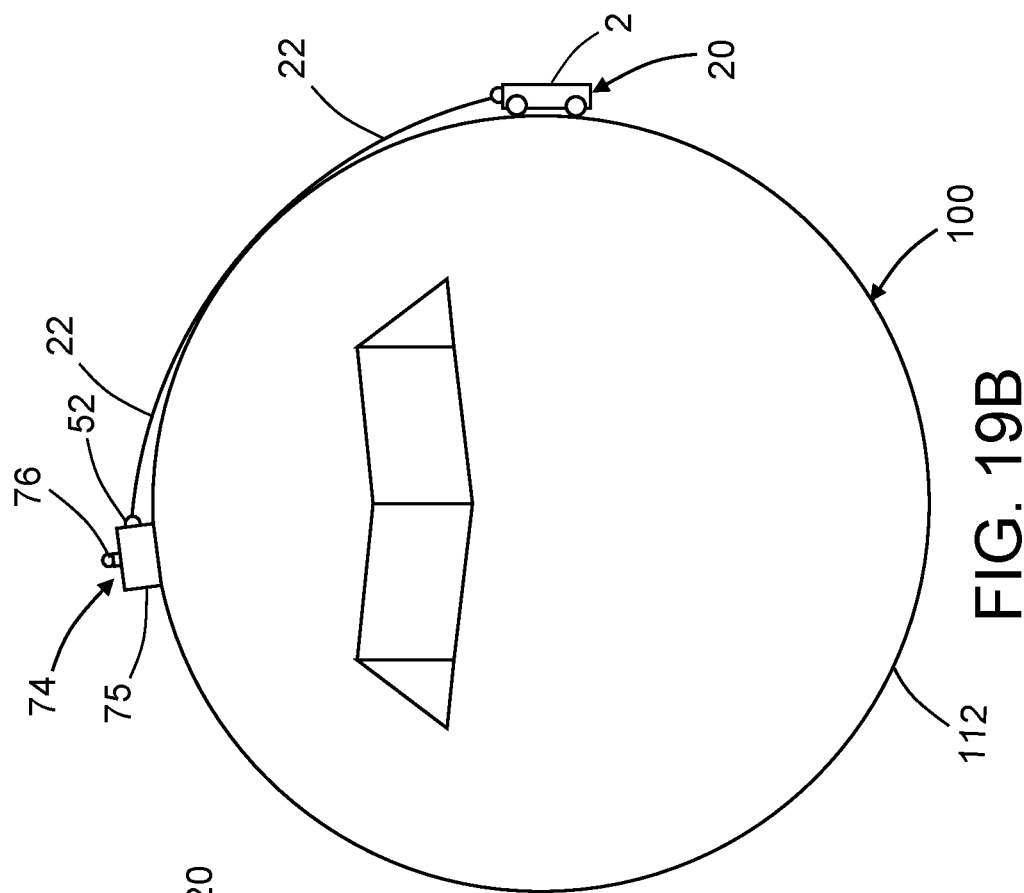
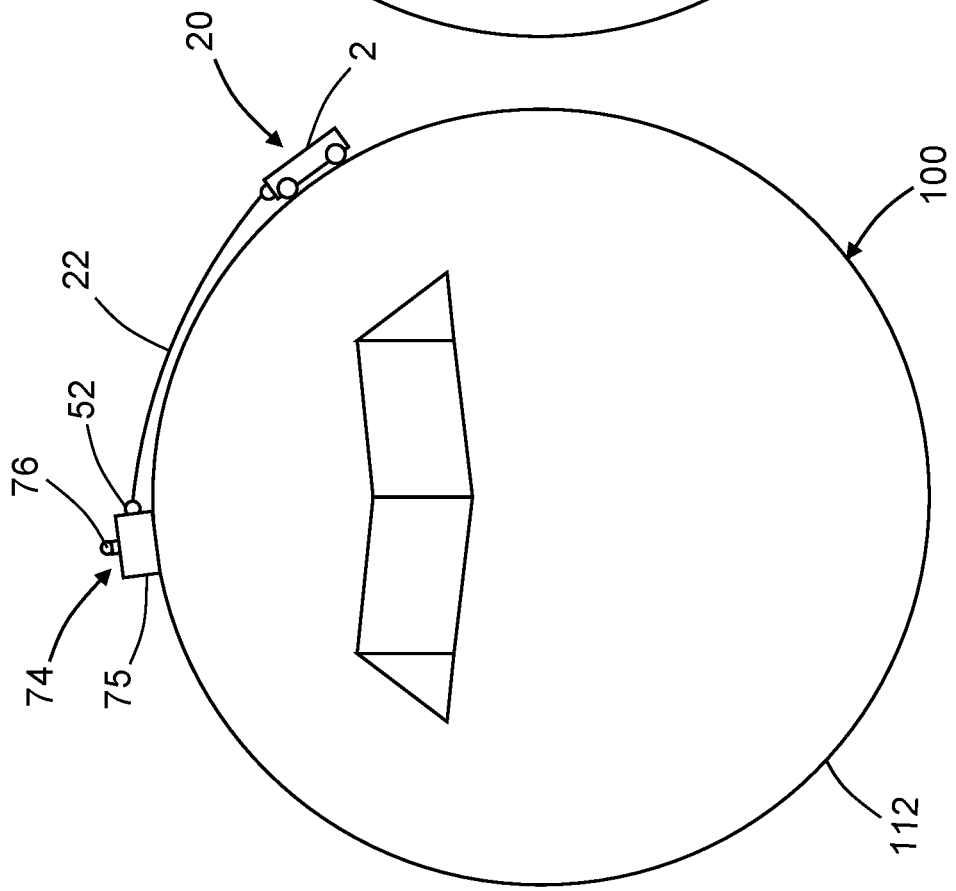

GRAVITY COMPENSATION FOR SELF-PROPELLED ROBOTIC VEHICLES CRAWLING ON NON-LEVEL SURFACES

BACKGROUND

This disclosure generally relates to automated systems for carrying maintenance tools across surfaces, such maintenance tools including (but not limited to) sensors used in non-destructive inspection (NDI). In particular, this disclosure relates to self-propelled surface-crawling robotic vehicles (hereinafter "crawler vehicles") that are capable of moving on inclined or vertical surfaces (hereinafter "non-level surfaces") of large structures such as aircraft fuselages, storage tanks and wind turbine blades.

It is known to manually inspect and clean large structures such as aircraft fuselages, storage tanks and wind turbine blades by hoisting a person to a position adjacent to the structure. However, manual inspection and cleaning can be time-consuming and difficult operations. To mitigate the drawbacks of manual inspection and cleaning, various solutions involving automated apparatus (e.g., crawler vehicles) configured to travel along non-level surfaces of a large structure have been proposed. For example, solutions have been proposed in which a tool-equipped crawling vehicle is attached to the end of a tether cable while the crawler vehicle is in contact with and "adhered" to a non-level surface by suction or vacuum forces. The vacuum adherence functionality is provided by one or more vacuum adherence devices that enable the crawler vehicle to adhere to but still translate and/or rotate over the non-level surface.

In applications where crawler vehicles need to operate on non-level surfaces, such as moving around the circumference of an airplane fuselage, the magnitude of the vacuum adherence forces needed to sustain the desired position and navigate may be difficult to attain. And even in those cases where sufficient vacuum adherence force is available, the locomotion power required for moving the crawler vehicle in vertical or nearly vertical directions can be undesirably high. Increasing the adherence force or locomotion power adds complexity and cost to these robotic systems, and can limit their cost-effective use cases.

The existing solutions of higher suction flow (vacuum adherence) or higher-energy electrostatics (attraction) require increased complexity and system costs, as well as performance risks, including surface damage due to high adherence loads. Current solutions do not address the slippage problem associated with dirt, grease, water, or other debris on the surface of the structure on which the robot is crawling. Current tethers can keep crawler vehicles from falling to the ground, but do not help maintain vacuum adherence or electrostatic attraction to the surface in the face of gravity. Current solutions do not help crawler vehicles to maintain movement along a horizontal line without slippage in the direction of gravity. They also do not enable ascending vertical motion without higher adherence or power requirements.

SUMMARY

The subject matter disclosed in some detail below is directed to apparatus and methods for providing gravity compensation to a cable-suspended, vacuum-adhered, tool-equipped crawler vehicle traveling along and following the contour of a non-level surface during the execution of an automated maintenance operation (e.g., non-destructive inspection or other maintenance operation). One technical feature shared by multiple embodiments of the gravity-compensating systems disclosed herein is that a cable spool (not onboard the tool-equipped crawler vehicle) is rotated to wind a portion of the cable from which the vacuum-adhered crawler vehicle is suspended to generate a tensile force that counteracts a gravitational force being exerted on the crawler vehicle during movement. Rotation of the cable spool may be driven by a motor or by a tensioning spring.

Several embodiments are disclosed in some detail below, which embodiments include configurations of components that vary in dependence on the geometry of the structure undergoing maintenance. For examples, an aircraft fuselage may have sections with cylindrical external surfaces and storage tanks may have a spherical external surface, a cylindrical side external surface with a dome-shaped top external surface, or a cylindrical side external surface with a flat top external surface.

The vacuum adherence functionality referred to above is provided by one or more vacuum adherence devices that enable each crawler vehicle to adhere to but still translate and/or rotate over the surface to which the crawler vehicle is adhered. Each vacuum adherence device is designed to "float" when the vacuum adherence device is partially evacuated. As used herein, "float" means that the suction components are compliant (spring loaded) with low-friction pads that slide across the surface. The system is rotationally complaint as well as compliant along the Z-axis. The resulting total suction force is strong enough to adhere the crawler vehicle to the structure, but not so strong as to inhibit lateral displacement or rotation. Thus, the term "adherence" as used herein means a floating adherence that allows the crawler vehicles to move over a surface. In contrast, the term "attachment" as used herein includes non-floating adherence (a.k.a. adhesion) and does not include floating adherence.

Although various embodiments of apparatus and methods for providing gravity compensation for cable-suspended, vacuum-adhered, tool-equipped crawler vehicles on non-level surfaces are described in some detail later herein, one or more of those embodiments may be characterized by one or more of the following aspects.

One aspect of the subject matter disclosed in detail below is a method for compensating for gravity during movement of a crawler vehicle on a surface of a body (e.g., an aircraft fuselage or a storage tank). The method comprises: (a) attaching one end of a first cable to a first crawler vehicle; (b) attaching another end of the first cable to a first spool of a second crawler vehicle; (c) placing the first crawler vehicle at a first position in contact with a first surface area on the surface of the body, wherein the first surface area is non-level; (d) placing the second crawler vehicle at a second position in contact with a second surface area on the surface of the body; (e) adhering the first crawler vehicle to the surface of the body using suction; (f) while the first crawler vehicle is adhered to the surface, moving the first crawler vehicle along a first path that extends from the first position to a third position in contact with a third surface area on the surface of the body; (g) tensioning the first cable to exert a tensile force on the first crawler vehicle having a vector component in opposition to a force of gravity tending to urge the first crawler vehicle to a lower elevation during step (f); and (h) operating a maintenance tool of the first crawler vehicle to perform a maintenance operation on the surface at a point along the first path, wherein step (g) comprises winding a portion of the first cable on the first spool.

In accordance with one embodiment of the method described in the immediately preceding paragraph, the method further comprises attaching the second crawler vehicle to the surface at the second position by producing an attachment force having a magnitude sufficient to prevent detachment of the second crawler vehicle even when supporting an entire weight of the first crawler vehicle. The attachment force may be produced, for examples, by one of the following forces: suction, electrostatic adhesion or magnetic attraction.

In accordance with another embodiment, the method further comprises: moving the second crawler vehicle along a second path while the first crawler vehicle is moving along the first path; and operating a maintenance tool of the second crawler vehicle to perform a maintenance operation on the surface at a point along the second path.

In accordance with a further embodiment, the method further comprises: (i) attaching one end of a second cable to a third crawler vehicle; (j) attaching another end of the second cable to a second spool of the second crawler vehicle; (k) placing the third crawler vehicle at a fourth position in contact with a fourth surface area on the surface of the body, wherein the fourth surface area is non-level; (l) adhering the third crawler vehicle to the surface of the body using suction; (m) while the third crawler vehicle is adhered to the surface, moving the third crawler vehicle along a second path that extends from the fourth position to a fifth position in contact with a fifth surface area on the surface of the body; and (n) tensioning the second cable to exert a tensile force on the third crawler vehicle having a vector component in opposition to a force of gravity tending to urge the third crawler vehicle to a lower elevation during step (m).

In accordance with yet another embodiment, the method further comprises: attaching one end of a second cable to a second spool of a ground vehicle; attaching another end of the second cable to the second crawler vehicle; and placing the ground vehicle in contact with the ground on the other side of the vertical mid-plane, wherein step (g) comprises winding a portion of the second cable on the second spool.

Another aspect of the subject matter disclosed in detail below is a method for performing a maintenance operation on a body having a top surface and a non-level side surface that extends downward to elevations lower than a lowest elevation of the top surface. The method comprises: (a) attaching one end of a cable to a crawler vehicle that is carrying a maintenance tool; (b) attaching another end of the cable to a spool of an anchor device; (c) placing the anchor device in contact with the top surface of the body; (d) attaching the anchor device to the top surface with an attachment force having a magnitude sufficient to prevent detachment of the anchor device by producing an attachment force having a magnitude sufficient to prevent detachment of the crawler vehicle even when supporting an entire weight of the crawler vehicle; (e) placing the crawler vehicle in contact with the non-level side surface of the body; (f) adhering the crawler vehicle to the non-level side surface using suction; (g) moving the crawler vehicle along a path while the crawler vehicle is adhered to the non-level side surface; (h) tensioning the cable to exert a tensile force on the crawler vehicle having a vector component in opposition to a force of gravity tending to urge the crawler vehicle to a lower elevation during step (g); and (i) operating the maintenance tool to perform a maintenance operation on the non-level side surface at a point along the path.

In accordance with some embodiments of a method for performing a maintenance operation on a body having a top surface with a circular outer periphery, the method described in the immediately preceding paragraph further comprises: rotatably coupling a spool to a distal end of a rotatable arm; placing a proximal end of the rotatable arm on the top surface of the body so that a center of rotation of the rotatable arm is aligned with a center of the circular outer periphery; and rotating the rotatable arm, wherein the rotatable arm has a length that enables a portion of the spool to extend beyond the circular outer periphery of the top surface during rotation of the rotatable arm about the center of rotation.

A further aspect of the subject matter disclosed in detail below is an apparatus comprising a first and second crawler vehicles and a cable having one end connected to the first crawler vehicle and another end connected to the second crawler vehicle, wherein: each of the first and second crawler vehicles comprises: a frame; at least one vacuum adherence device attached to or integrated with the frame; a set of wheels rotatably coupled to the frame; a drive motor operatively coupled to drive rotation of at least one of the wheels; and a computer system configured to control operation of the drive motor, the first crawler vehicle further comprises a maintenance tool configured for performing a maintenance operation; and the second crawler vehicle further comprises a cable spool to which the other end of the cable is attached and a spool motor.

Yet another aspect of the subject matter disclosed in detail below is an apparatus comprising an anchor device, a crawler vehicle and a cable having one end connected to the anchor device and another end connected to the crawler vehicle, wherein the anchor device comprises: an anchor base; at least one attachment device coupled to the anchor base for attaching the anchor device to a surface; a cable spool to which the one end of the cable is attached; a spool motor operatively coupled to drive rotation of the cable spool; and a first computer system configured to control operation of the spool motor, and wherein the crawler vehicle comprises: a frame; at least one vacuum adherence device attached to or integrated with the frame; a set of wheels rotatably coupled to the frame; a drive motor operatively coupled to drive rotation of at least one wheel of the set of wheels; a maintenance tool coupled to the frame and configured for performing a maintenance operation; and a second computer system configured to control operation of the drive motor and the maintenance tool.

In accordance with some embodiments of the apparatus described in the immediately preceding paragraph, the apparatus further comprises: a turret which is rotatably coupled to the anchor base; and an arm having a proximal end connected to or integrally formed with the turret and a distal end to which the cable spool is rotatably coupled.

Other aspects of an apparatus and methods for providing gravity compensation for cable-suspended, vacuum-adhered, tool-equipped crawler vehicles moving on non-level surfaces are disclosed below.

BRIEF DESCRIPTION OF THE DRAWINGS

The features, functions and advantages discussed in the preceding section may be achieved independently in various embodiments or may be combined in yet other embodiments. Various embodiments will be hereinafter described with reference to drawings for the purpose of illustrating the above-described and other aspects. None of the diagrams briefly described in this section are drawn to scale.

FIGS. 1A and 1B are diagrams representing front end views of an aircraft fuselage at two different instants in time during an automated maintenance procedure performed using a gravity-compensating system that includes a pair of cable-suspended, vacuum-adhered crawler vehicles in accordance with a first embodiment. The length of paid-out cable shown In FIG. 1B is greater than the length of paid-out cable shown In FIG. 1A.

FIGS. 2A and 2B are diagrams representing views of respective storage tanks undergoing automated maintenance using a pair of cable-suspended, vacuum-adhered crawler vehicles.

FIGS. 12A-12D are diagrams representing top views of a holonomic-motion crawler vehicle in accordance with an alternative embodiment which has a passive connection that pivots about the center of the vertical axis of the vehicle, with an arm that is shaped to allow the cable force to project through the center of mass of the vehicle (but not interfere with the crawler or the sensor payload).

FIG. 17 is a block diagram identifying some components of a system for performing an ultrasonic inspection on a surface of a body in accordance with one proposed computer architecture.

FIGS. 19A and 19B are diagrams representing front end views of an aircraft fuselage at two different instants in time during an automated maintenance procedure performed using a gravity-compensating system that includes an anchor device and a cable-suspended, vacuum-adhered, tool-equipped crawler vehicle in accordance with a fourth embodiment. The length of paid-out cable shown In FIG. 19B is greater than the length of paid-out cable shown In FIG. 19A.

Reference will hereinafter be made to the drawings in which similar elements in different drawings bear the same reference numerals.

DETAILED DESCRIPTION

Figure 3A:
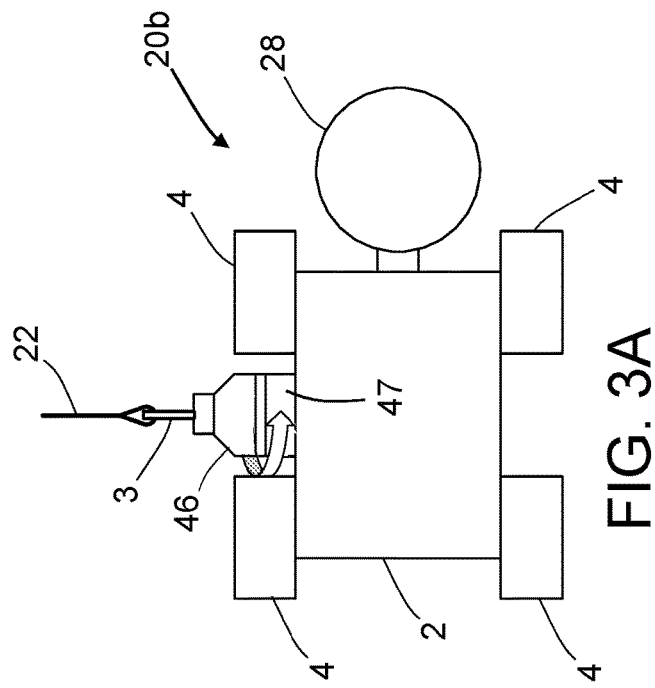
FIG. 3A is a diagram representing a top view of a cable-suspended, vacuum-adhered, tool-equipped crawler vehicle in accordance with one embodiment.

The improvements disclosed herein may be incorporated in or utilized with an automated apparatus for performing maintenance functions on large structures such as aircraft fuselages and storage tanks. As used herein, the term "maintenance" includes, but is not limited to, operations such as non-destructive inspection, drilling, scarfing, grinding (e.g., to remove bonded or bolted components), fastening, applique application, ply mapping, cleaning, marking and painting.

For the purpose of illustration, apparatus and methods for performing automated maintenance operations on an aircraft fuselage or on a storage tank will now be described in detail. However, not all features of an actual implementation are described in this specification. A person skilled in the art will appreciate that in the development of any such embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

A maintenance tool is a device that performs a maintenance operation, such as non-destructive inspection or cleaning of an external surface of a body at multiple positions along a scan path. In accordance with some embodiments disclosed hereinafter, the automated apparatus comprises one or more maintenance tool-equipped crawler vehicles suspended from cables. In the case where the maintenance operation is non-destructive inspection, a cable-suspended crawler vehicle may scan an area on a surface of a body. The cable length may be adjusted to change the elevation of the crawler vehicle to ensure full coverage of the surface during scanning.

In accordance with some embodiments, the crawler vehicles are configured to be capable of holonomic motion. A holonomic-motion system is one that is not subject to motion constraints. As used in this disclosure, a vehicle is considered to be holonomic if the controllable degrees of freedom are equal to the total degrees of freedom. This type of vehicle can translate in any direction while simultaneously rotating. This is different than most types of ground vehicles, such as car-like vehicles, tracked vehicles, or wheeled differential-steer (skid-steer) vehicles, which cannot translate in any direction while rotating at the same time.

The maintenance tool of the crawler vehicle may be selected from a group of interchangeable maintenance tools, including NDI sensors of different types (e.g., an ultrasonic transducer array, an infrared thermography unit, a video camera, an optical three-dimensional coordinate measuring machine or a laser line scanner), a cleaning unit, and so forth. In accordance with one proposed implementation, the automated apparatus comprises a pair of crawler vehicles each capable of supporting any one of a plurality of maintenance tools for performing a set of maintenance functions on an aircraft fuselage or a storage tank. As a whole, the automated apparatus disclosed herein reduces maintenance time, labor hours and human errors and increases safety.

When performing automated maintenance operations on structures or bodies that have large surface areas (such as an aircraft fuselage or a storage tank), it is common practice to use a tool-equipped crawler vehicle that is vacuum adhered and then moved relative to the surface being maintained. In cases wherein the maintenance operation involves covering an entire surface (e.g., when scanning a surface during a non-destructive inspection), the maintenance tool may, for example, scan adjacent vertical or horizontal strip-shaped zones in successive passes. In applications where tool-equipped crawler vehicles need to operate on steep or vertical surfaces, such as moving around the circumference of an airplane fuselage, the attachment forces needed to sustain the desired position and navigate on the surface can be very high. And even in those cases where sufficient attraction force is available, the locomotion power required for moving the crawler vehicle in vertical or nearly vertical directions can be very high.

To address these issues, this disclosure proposes in some situations (like the fuselage example) to have two or more crawler vehicles tethered (by means of a cable) together to assist each other during scanning operations by providing lift assistance forces with a significant vertical component to counteract gravity. In one example, the crawler vehicles may be located on and vacuum adhered to opposite sides of a target object and equipped with means for providing balanced forces to each crawler vehicle for the purpose of lift assistance as well as to keep each other from falling should one crawler vehicle lose surface adhesion.

In accordance with one embodiment, two crawler vehicles are disposed on opposite sides of an aircraft fuselage and connected by a tether cable. One of the crawler vehicles is equipped with a winch while the other crawler vehicle is equipped with a tool (e.g., an NDI sensor unit) for performing a maintenance operation. During the maintenance operation, the cable-suspended crawler vehicles are subject to gravitational forces that tend to urge the crawler vehicles to lower elevations. The length and tension of the tether cable is managed by the winch which includes a cable spool that is rotated to produce tension in the cable. The tension in the cable in turn exerts a tensile force on the tool-equipped crawler vehicle, which tensile force has a vector component in opposition to the force of gravity that is tending to urge the tool-equipped crawler vehicle to a lower elevation.

In addition to aircraft fuselages, large and small holding tanks, oil and gas tanks, large pipelines, and other large structures could be maintained (e.g., inspected) using active anti-gravity tethering of two or more crawling vehicles.

FIGS. 1A and 1B are diagrams representing front end views of an aircraft fuselage 100 at two different instants in time during an automated maintenance procedure performed using a gravity-compensating system in accordance with a first embodiment that includes a pair of cable-suspended, vacuum-adhered crawler vehicles 20a and 20b. Each of the crawler vehicles 20a and 20b include a frame 2 and four wheels 4 rotatably coupled to the frame 2. Although not shown in FIGS. 1A and 1B, the crawler vehicle 20b carries a maintenance tool. Optionally, the crawler vehicle 20a, which includes a cable spool 52a, may also carry a maintenance tool. Each of the crawler vehicles 20a and 20b includes a multiplicity of motors, a multiplicity of motor controllers and may include a computer (not shown in FIGS. 1A and 1B) configured to enable the crawler vehicle to move autonomously over the external surface 112 of the aircraft fuselage 100 during a maintenance operation. However, as seen in FIGS. 1A and 1B, the crawler vehicles 20a and 20b are tethered to each other by means of a cable 22. (Note that in FIGS. 1A and 1B and some other figures, cable 22 is drawn in an arc shape even though it is sometimes separated from the surface, instead of a straight line tangent to the surface; this was done to make the cable 22 easier to see in the figures and simpler to draw.) One end of the cable 22 is attached to the cable spool 52a of the crawler vehicle 20a while the other end of the cable 22 is attached to the frame 2 (e.g., by means of a hook) of the crawler vehicle 20b. Thus at any given moment in time, the ability of one crawler vehicle to move in a cable tensioning direction aligned with the cable 22 at the point of cable attachment is constrained. When the cable 22 is taut, movement of the crawler vehicle 20b in a cable tensioning direction is enabled by pay-out of an additional length of cable 22 by the cable spool 52a of the crawler vehicle 20a or by simultaneous movement of the connected vehicle.

FIG. 1A depicts the aircraft fuselage 100 at a first instant in time when the crawler vehicles 20a and 20b are symmetrically disposed on opposite sides of a vertical plane of symmetry 108 (indicated by a dashed line in FIG. 1A) at a first elevation. In this situation, the length of paid-out cable shown In FIG. 1A is equal to a first length. While at the first elevation on opposite sides of a symmetrical aircraft fuselage 100, the wheels 4 of the crawler vehicles 20a and 20b will be in contact with respective non-level surface areas having angles of inclination which are equal in magnitude but opposite in sign (or if the surface areas are convex curved, the lines connecting the endpoints of respective arc-shaped profiles will have angles of inclination which are equal in magnitude but opposite in sign). In the symmetrical state depicted in FIG. 1A, the gravitational forces respectively exerted on the crawler vehicles 20a and 20b (assuming equal masses) will be equal and balanced.

During a maintenance operation (e.g., during non-destructive inspection), the crawler vehicles 20a and 20b may be moved concurrently in opposite directions in a vertical plane perpendicular to the vertical plane of symmetry 108 (and perpendicular to a longitudinal axis of the aircraft fuselage 100) to change their elevation. For example, FIG. 1B depicts the aircraft fuselage 100 at a second instant in time (subsequent to the first instant in time) when the crawler vehicles 20a and 20b are symmetrically disposed on opposite sides of the vertical plane of symmetry 108 at a second elevation which is lower than the first elevation. To position the crawler vehicles 20a and 20b at these positions, an additional length of cable 22 is paid out from the cable spool 52a, which allows the circumferential distance separating the crawler vehicles 20a and 20b to increase as seen in FIG. 1B. In other words, the length of paid-out cable 22 shown in FIG. 1B is greater than the length of paid-out cable shown In FIG. 1A.

In either of the situations depicted in FIGS. 1A and 1B, the crawler vehicles 20a and 20b may be concurrently moved horizontally along the external surface 112 during a scanning operation. For example, if crawler vehicle 20b were carrying an ultrasonic transducer array, then a stripe-shaped area of the external surface 112 may be ultrasonically inspected along a first scan path having a scan path length, which first scan path is generally horizontal.

For example, in a case where the crawler vehicle 20b is vacuum adhered to an inclined surface without connection to a cable 22 and is capable of holonomic motion, the amount of suction being produced must be adjusted to produce wheel frictional forces sufficient to counteract the gravitational force component parallel to the inclined surface. The greater the magnitude of the suction forces generated, the greater the amount of electric power consumed. In addition, the fan motors producing the suction forces must be designed to produce higher fan speeds, thereby increasing the cost and weight of the crawler vehicle.

This disclosure proposes to reduce the amount of electrical power consumed and the cost and weight of the crawler vehicle by providing gravity-compensating means in the form of a cable 22. As will be explained in more detail below, the presence of a cable-provided tensile force on the crawler vehicle allows the suction forces to be reduced, thereby enabling the design of a crawler vehicle that is lighter in weight, lower in cost and uses less electrical power to maintain a true horizontal scan path.

Still referring to FIGS. 1A and 1B, the assistant tensile force applied by the cable 22 is generated by producing a torque on the cable spool 52a to which the cable 22 is connected. The crawler vehicle 20a on which the cable spool 52a is mounted may be operated to move concurrently along a second scan path that mirrors the first scan path of the crawler vehicle 20b. As the crawler vehicles 20a and 20b move horizontally in tandem, the cable spool 52a on the crawler vehicle 20a may be torqued to change the tension in cable 22, thereby adjusting the tensile force being exerted on the crawler vehicle 20b to counteract the gravitational force being exerted during scanning.

In an alternative scanning scenario, the crawler vehicle 20b may be designed for vertical scanning an aircraft fuselage 100. For example, as the crawler vehicle 20b moves upward from the lower elevation depicted in FIG. 1B to the higher elevation depicted in FIG. 1A, an ultrasonic transducer array mounted to the crawler vehicle 20b may be activated to acquire ultrasonic inspection data from a vertical stripe-shaped surface area on the external surface 112 of the aircraft fuselage 100. During this vertical scan, the wheel frictional forces needed to overcome the force of gravity may be reduced by tensioning the cable 22 as previously described to provide gravity-compensating assistance.

In accordance with a further alternative embodiment, the spool-equipped crawler vehicle 20a may also be equipped with a maintenance tool. In this case maintenance operations may be performed concurrently on both sides of the aircraft fuselage 100. During horizontal motion in tandem, the length of the cable 22 may be constant (to the extent that the external surface being scanned is circular cylindrical) while the tension in the cable 22 is adjusted to provide anti-gravity assistance to both crawler vehicles. During upward vertical motion in tandem, the length of the cable 22 decreases as the crawler vehicles 20a and 20b move upward and the tension in the cable 22 may be repeatedly adjusted to provide anti-gravity assistance as both crawler vehicles 20a and 20b are lifted.

The concept of scanning an external surface of a large body using a pair of tethered crawler vehicles is not limited in its application to aircraft fuselages. FIG. 2A is a diagram representing a view of a spherical storage tank 102 undergoing automated maintenance using a pair of vacuum-adhered crawler vehicles 20a and 20b (equipped respectively with a cable spool 52 and a maintenance tool as previously described with reference to FIGS. 1A and 1B) connected to opposite ends of a cable 22. The crawler vehicles 20a and 20b are vacuum adhered to the spherical surface 113 at opposed positions lying in a hypothetical vertical plane that bisects the sphere. A pivoting guide 15 includes a base attached to the crown of the spherical storage tank 102 and a turret that rotates relative to the attached base. The base of the pivoting guide 15 may be attached to the top of the sphere by suction, magnetic attraction or electroadhesion, for example. The turret has a linear groove or channel in which an intermediate portion of the cable 22 is placed. As the crawler vehicles 20a and 20b move in tandem around the spherical storage tank 102 at the same elevation and in the same direction, the turret of the pivot guide 15 rotates about an axis of rotation. At the same time, the groove or channel in which the cable 22 is seated constrain the cable 22 so that the cable 22 always passes over the highest point on the sphere and does not slide off, thereby enabling the crawler vehicles 20a and 20b to maintain opposed positions at any elevation as the crawler vehicles 20a and 20b travel circumferentially around the spherical surface 113. The pivoting guide 15 could be dropped off and picked up by one of the crawler vehicles or it could be placed by some other means (such as a crane).

FIG. 2B is a diagram representing a view of a storage tank 104 of different geometry undergoing automated maintenance using a pair of vacuum-adhered crawler vehicles 20a and 20b (equipped respectively with a cable spool 52 and a maintenance tool as previously described with reference to FIGS. 1A and 1B) connected to opposite ends of a cable 22. In this case, the storage tank 104 has a vertical side surface 114 and a convex curved top surface 116. As previously described with reference to FIG. 2A, a pivoting guide (not shown in FIG. 2B) may be attached to the highest point of the convex curved top surface 116 to prevent the cable 22 from sliding off during a maintenance procedure. FIG. 2B depicts a scenario in which the crawler vehicles 20a and 20b are vacuum adhered to the vertical side surface 114 at the same elevation but in diametrically opposed positions. In this situation, crawler vehicle 20a may perform a maintenance operation on the vertical side surface 114 of the storage tank 104. Optionally, the tethered and vacuum-adhered crawler vehicles 20a and 20b depicted in FIG. 2B may be used to perform a maintenance operation on the convex curved top surface 116 of the storage tank 104. During such maintenance operations, the system may be operated to generate a tension in the cable 22 that exerts a gravity-compensating tensile force on the crawler vehicle 20b as previously described with reference to FIGS. 1A and 1B.

Figure 3B:
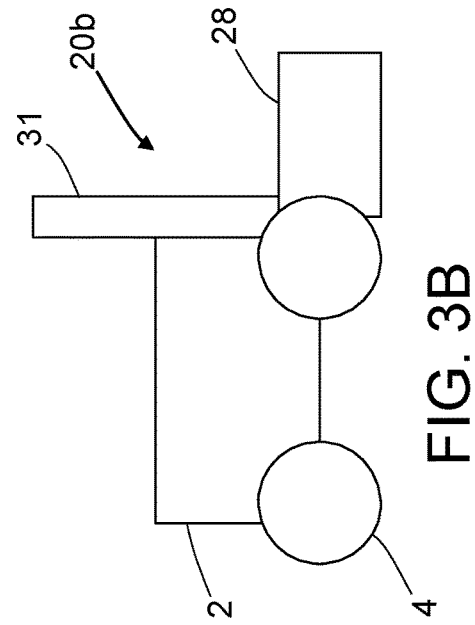
FIGS. 3B and 3C are side and end views respectively of the cable-suspended, vacuum-adhered, tool-equipped crawler vehicle depicted in FIG. 3A.
Figure 3C:
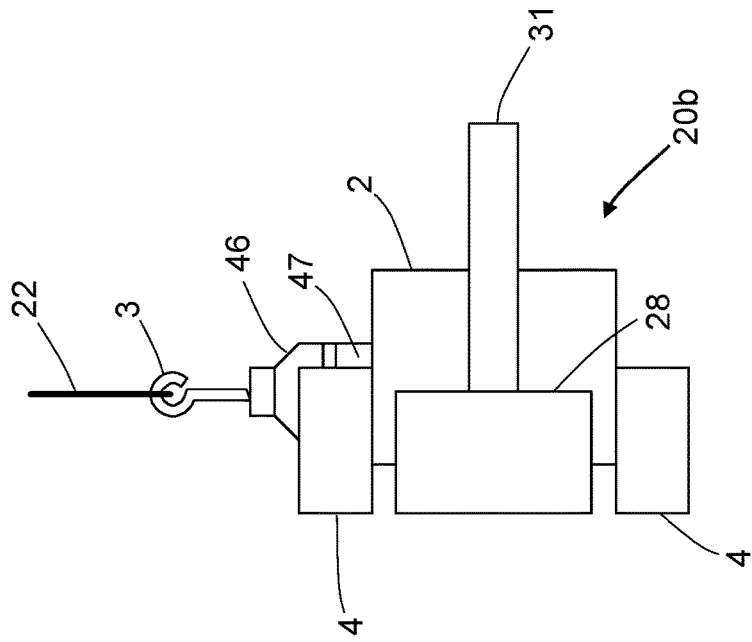

FIG. 3A is a diagram representing a top view of a cable-suspended crawler vehicle 20b having a turret-mounted cable hook 3 in accordance with one embodiment. FIGS. 3B and 3C are side and end views respectively of the cable-suspended crawler vehicle 20b depicted in FIG. 3A. The crawler vehicle 20b depicted in FIGS. 3A and 3C is suspended from a cable 22. Preferably the shaft of the cable hook 3 is attached to the frame 2 at a point which is vertically aligned with a center-of-mass of the crawler vehicle 20b. The crawler vehicle 20b has four wheels 4 with respective axes of rotation that lie in a plane. This plane will be referred to herein as the "crawler vehicle plane". The crawler vehicle 20b depicted in FIGS. 3A-3C includes a maintenance tool 28 that is translatable along an axis that may be perpendicular to the crawler vehicle plane. This capability enables the maintenance tool 28 to be lifted over obstacles in the path of the crawler vehicle 20b. In accordance with one embodiment, the means for translating the maintenance tool 28 normal to the confronting external surface of the structure undergoing maintenance may take the form of a motorized linear slide 31. In the alternative, there are many different types of actuators that may be used with a linear motion bearing. For example, the maintenance tool 28 may be affixed to a carriage that is driven to slide by a linear actuator (e.g., a motorized lead screw, a motorized rack-and-pinion arrangement, a hydraulic actuator or a pneumatic actuator). In response to detection of an obstacle in the path of the crawler vehicle 20b, a controller (not shown in FIGS. 3A-3C) onboard or off-board the crawler vehicle 20b activates the linear actuator to cause the maintenance tool 28 to translate to a retracted position whereat contact with the obstacle may be avoided.

As best seen in FIG. 3A, the end of the cable 22 has a loop by means of which the crawler vehicle 20b may be hooked onto the end of the cable 22. The cable hook 3 is fixedly coupled to a turret 46 which is rotatable on a turret base 47 to facilitate alignment of the crawler vehicle 20b with a surface. The turret base 47 is fixedly coupled to the frame 2. In the proposed implementation depicted in FIGS. 3A-3C, the turret base 47 is attached to one side of the frame 2 and the turret 46 is rotatable about an axis of rotation which is parallel to the axes of rotation of the wheels 4. In an alternative proposed implementation (as depicted in FIGS. 1A and 1B), the cable 22 may be attached to one end of the frame 2. More specifically, the turret base 47 depicted in FIG. 3A may instead be attached to one end of the frame 2, in which case the turret 46 is rotatable about an axis of rotation which is perpendicular to the axes of rotation of the wheels 4.

Figure 4:
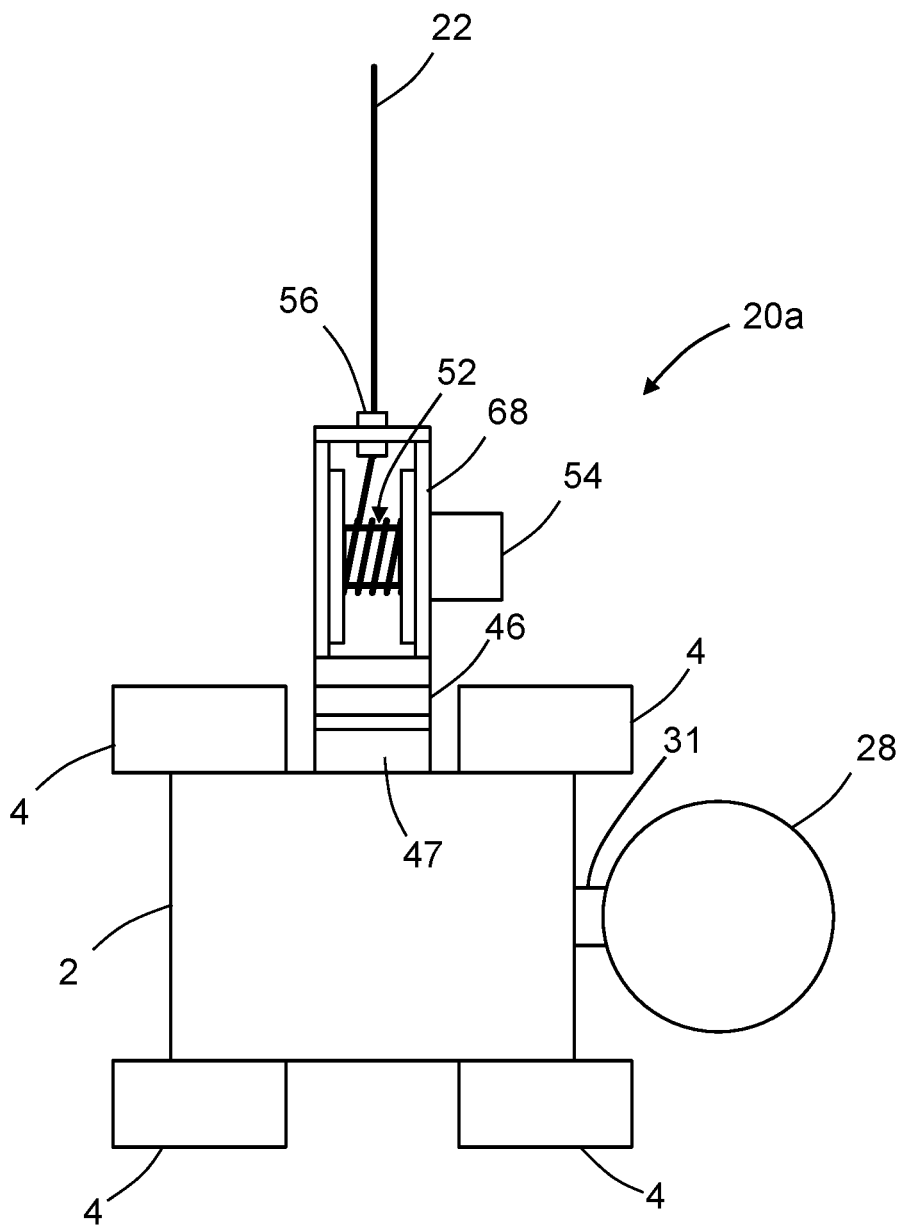
FIG. 4 is a diagram representing a top view of a cable-suspended, vacuum-adhered, spool-equipped crawler vehicle in accordance with one embodiment.

FIG. 4 is a diagram representing a top view of a cable-suspended, vacuum-adhered, spool-equipped crawler vehicle 20a in accordance with one embodiment. The crawler vehicle 20a has four wheels 4 with respective axes of rotation that lie in a plane. This plane will be referred to herein as the "crawler vehicle plane". The crawler vehicle 20a depicted in FIG. 4 includes a maintenance tool 28 that may be lifted in the manner previously described with reference to the crawler vehicle 20b depicted in FIGS. 3A-3C.

The crawler vehicle 20a further includes a cable spool 52 which is rotatably coupled to a spool support 68. The spool support 68 has an opening at the top where the cable 22 passes through a cable holder 56 that is inserted in the opening. During uptake or pay-out (i.e., winding or unwinding) of the cable 22, the cable spool 52 is driven to rotate by a spool motor 54 that is mounted to the spool support 68. The axis of rotation of the cable spool 52 is collinear with a spool axle (not shown in FIG. 4, but see spool axle 50 in FIG. 14A) of the cable spool 52.

The spool support 68 in turn is fixedly coupled to a turret 46 which is rotatable on a turret base 47 to facilitate alignment of a crawler vehicle 20 with a surface. The turret base 47 is fixedly coupled to the frame 2. The turret 46 is rotatable about an axis of rotation which is perpendicular to the spool axle 50 of the cable spool 52 and parallel to the crawler vehicle plane. Thus the spool support 68 is rotatable about an axis of rotation of the turret 46.

Each of the crawler vehicles 20a and 20b further includes a multiplicity of motors (not shown in FIGS. 3A-3C and 4, but see FIG. 14A) that receive electrical power via power/signal cords (not shown in FIGS. 1A and 1B) that extend from a ground-based control station to the crawler vehicles 20a and 20b. The power/signal cords also provide control signals from a controller (e.g., a computer system) at a ground-based control station which controls the operation of the motors on the crawler vehicles 20a and 20b. In cases where the maintenance tool 28 on crawler vehicle 20b (and optionally on crawler vehicle 20a) is an NDI sensor unit, the power/signal cord also provides a pathway for sending NDI sensor data acquired by the NDI sensor unit to ground-based controller.

In accordance with further alternative embodiments, the crawler vehicles 20a and 20b may communicate wirelessly with a ground-based control station while receiving electrical power from batteries mounted on the crawler vehicles 20a and 20b. This would avoid the use of a multiplicity of power/signal cords running from the crawler vehicles 20a and 20b to the ground-based control station. The wireless communications would include: (a) the sending of control signals from a transceiver at the ground-based control station to transceivers on the crawler vehicles 20a and 20b, which control signals are then forwarded to the motor controllers onboard crawler vehicles 20a and 20b for controlling movements of the crawler vehicles 20a and 20b; and (b) the sending of data acquired by the NDI sensor units onboard one or both crawler vehicles 20a and 20b from the transceivers onboard the crawler vehicles 20a and 20b to the transceiver at the ground-based control station.

Various embodiments of a crawler vehicle capable of traveling on level and non-level (e.g., inclined or vertical) surfaces will now be disclosed. In accordance with some embodiments of the system proposed herein, holonomic-motion crawler vehicles are employed. Various embodiments of a crawler vehicle capable of moving holonomically on level and non-level surfaces will be disclosed for the purpose of illustration. While some disclosed embodiments carry a non-destructive inspection sensor for inspecting the surface on which the crawler vehicle travels, the holonomic-motion crawler vehicles disclosed herein can alternatively carry other types of tools, such as tools needed in maintenance or painting operations.

Figure 5:
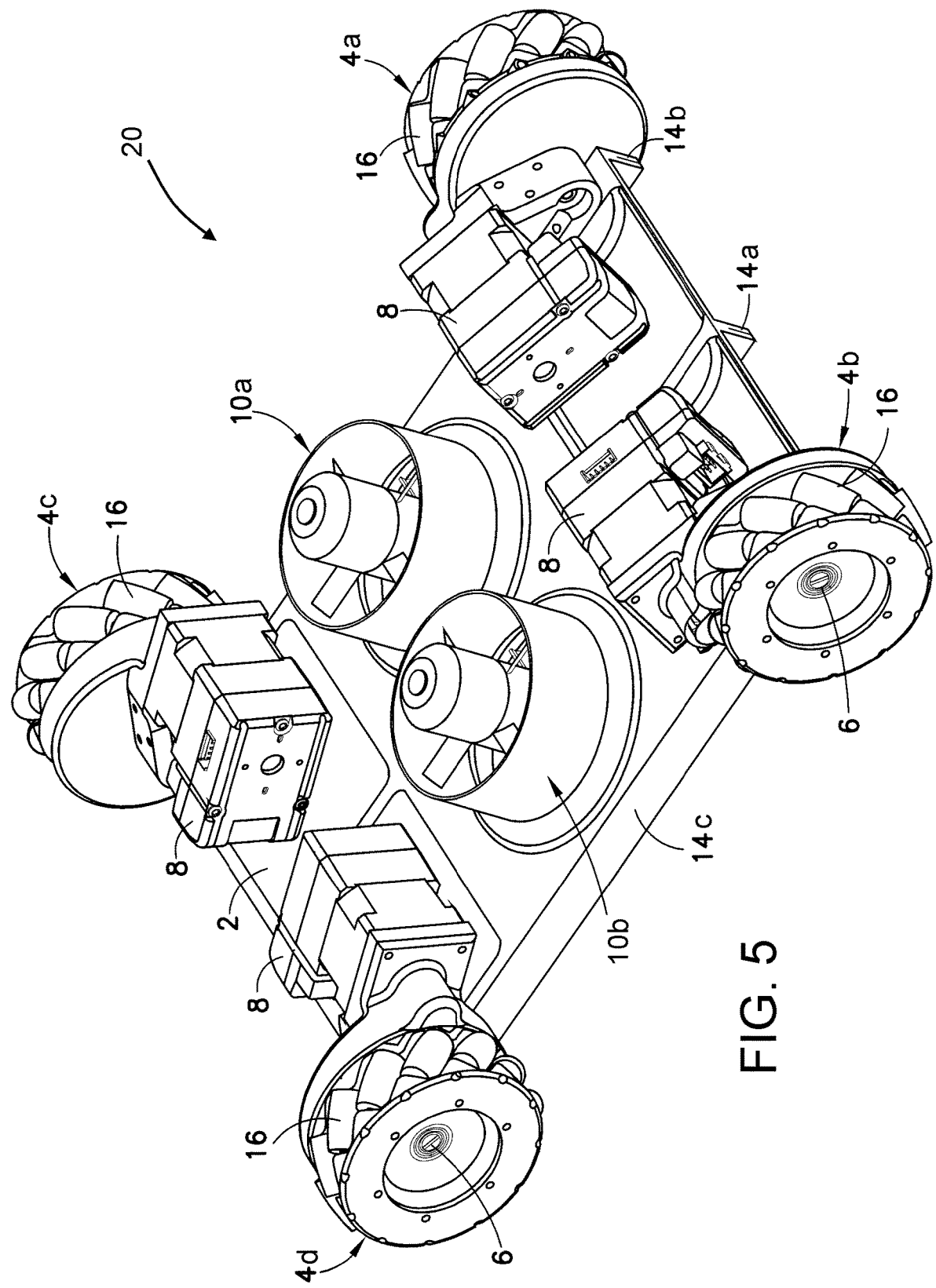
FIG. 5 is a diagram representing a three-dimensional view of parts of a holonomic-motion crawler vehicle having two suction zones in accordance with one embodiment. The electrical connections for supplying signals for controlling operation of the depicted components and other components are not shown.

FIG. 5 shows parts of a holonomic-motion crawler vehicle 20 having four Mecanum wheels and two suction zones in accordance with one embodiment. The electrical connections for supplying signals for controlling operation of the depicted components are not shown. This holonomic-motion platform comprises a frame 2 with four Mecanum wheels 4 (two type "A" and two type "B") mounted to the frame by means of respective wheel axles 6, and further comprises four independently controlled drive motors 8 (one per wheel). Each drive motor 8 controls the rotation of a respective wheel 4.

A Mecanum-wheeled vehicle is a holonomic system, meaning that it can move in any direction while simultaneously rotating. This is possible because of the shape of the wheels. The standard configuration for a Mecanum-wheeled vehicle has four Mecanum wheels (two type "A" and two type "B"). The Mecanum wheels are arranged with the "A" pair on one diagonal and the "B" pair on the other, with each having its axle perpendicular to a line running through the center of the vehicle. The axes of the rollers on the type "A" Mecanum wheels are at right angles to the axes of the rollers on the type "B" Mecanum wheels. However, the platform may have any multiple of four Mecanum wheel, e.g., 4, 8, 12, etc.

The holonomic-motion crawler vehicle 20 shown in FIG. 5 utilizes four Mecanum wheels 4a-4d. Each Mecanum wheel 4a-4d has a multiplicity of tapered rollers 16 rotatably mounted to its circumference, each tapered roller 16 being freely rotatable about its axis. These tapered rollers 16 have an axis of rotation which lies at a 45° angle with respect to the plane of the wheel. Type "A" Mecanum wheels have left-handed rollers, while Type "B" Mecanum wheels have right-handed rollers. The holonomic-motion crawler vehicle 20 can be made to move in any direction and turn by varying the speed and direction of rotation of each Mecanum wheel 4a-4d. For example, rotating all four wheels 4a-4d in the same direction at the same rate causes forward or backward movement; rotating the wheels on one side at the same rate but in the opposite direction of the rotation by the wheels on the other side causes the vehicle to rotate; and rotating the Type "A" wheels at the same rate but in the opposite direction of the rotation of the Type "B" wheels causes sideways movement.

Figure 14A:
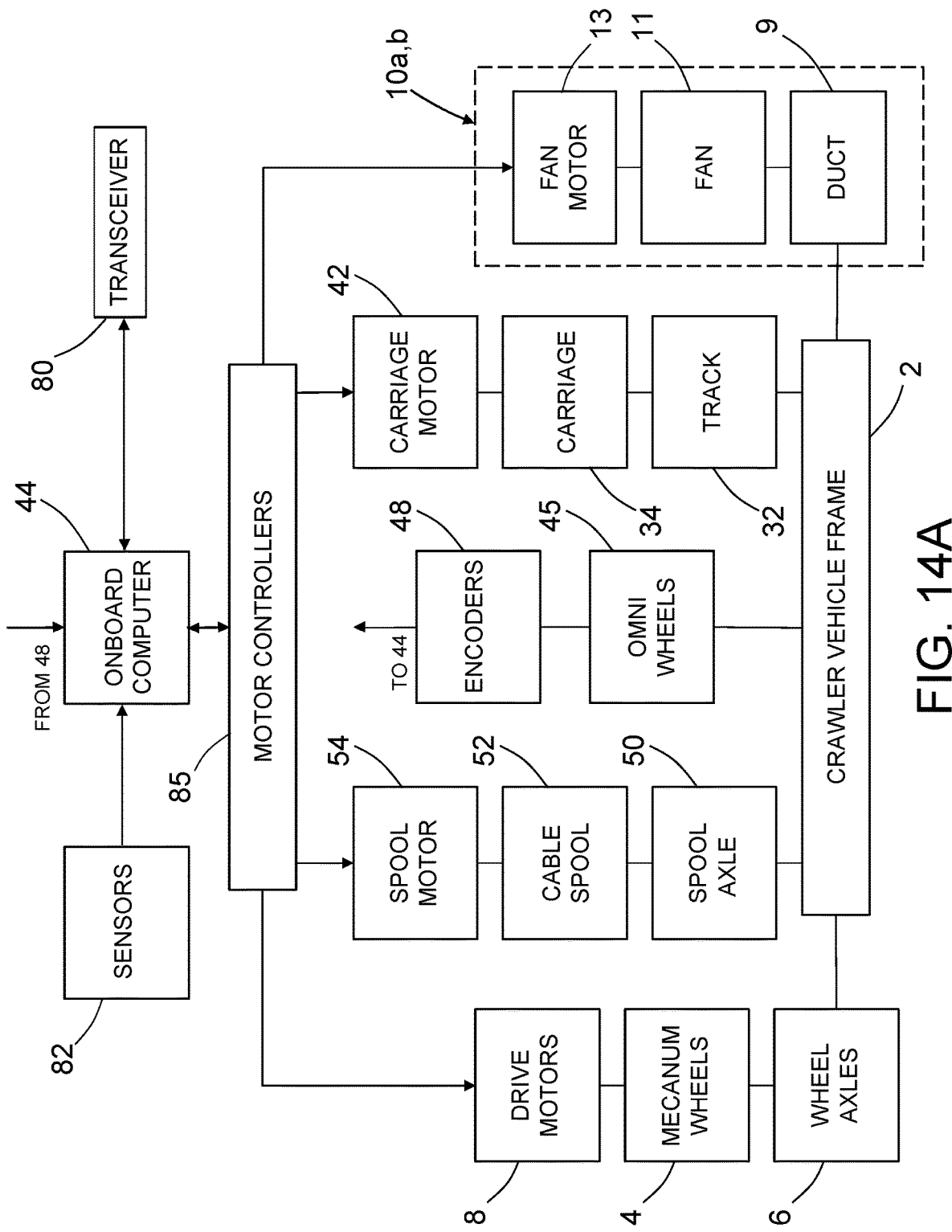
FIG. 14A is a block diagram identifying some components of a holonomic-motion crawler vehicle having both a cable spool and a carriage for a maintenance tool in accordance with another embodiment.

The embodiment depicted in FIG. 5 also has two suction devices arranged side by side in the middle of the frame 2, midway between the front and rear wheels. In this particular embodiment, the suction devices are respective electric ducted fans 10a and 10b which are mounted in a respective opening (not shown in FIG. 5) formed in the frame 2. As indicated in FIG. 14A, each electric ducted fan 10a and 10b includes a fan 11 which is rotatable about an axis, a duct 9 surrounding the fan 11, and an electric fan motor 13 which drives the fan 11 to rotate in a direction such that air is propelled from underneath the frame 2 up through the fan duct 9, thereby creating suction in the respective suction zones 12a and 12b (visible in FIG. 6).

Figure 6:
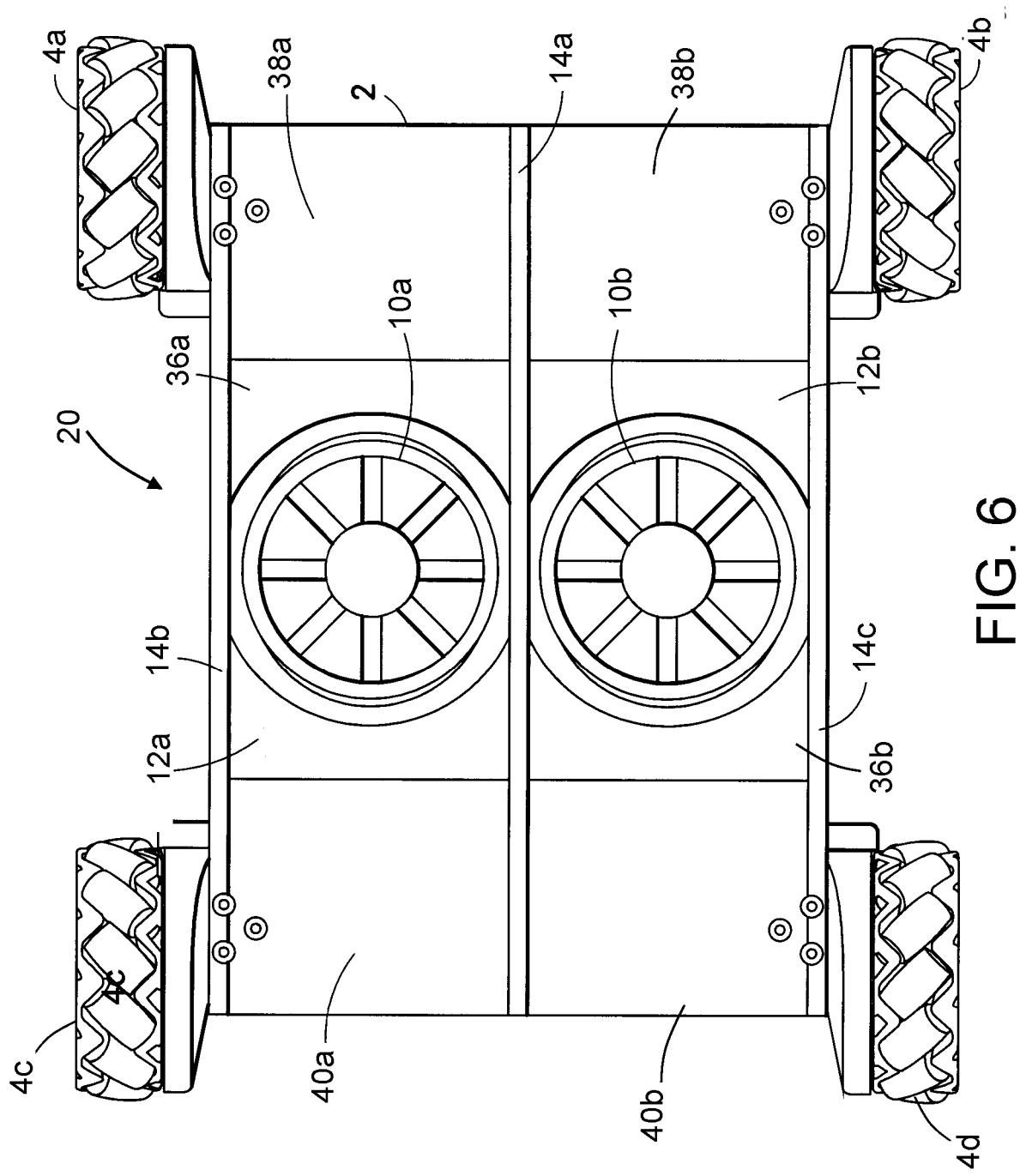
FIG. 6 is a diagram showing a bottom view of a Mecanum-wheeled crawler vehicle having dual suction zones.

FIG. 6 shows a bottom view of a Mecanum-wheeled crawler vehicle 20 having dual suction zones 12a and 12b separated by a middle skirt 14a which bisects the bottom surface of the frame 2 along a longitudinal axis. As best seen in FIG. 6, the two suction zones 12a and 12b are bounded on opposing sides by longitudinal low-surface-friction flexible skirts 14b and 14c which are attached to the frame 2, the middle skirt 14a forming a common boundary wall separating the two suction zones 12a and 12b. The skirts 14a-14c may extend downward so that their bottom edges contact the surface on which the vehicle is moving.

In this particular construction, the area of the bottom surface between skirts 14a and 14b comprises a flat central surface 36a having an opening of one electric ducted fan 10. This flat central surface 36a is flanked by forward and rearward convex surfaces 38a and 40a. Similarly, the area of the bottom surface between skirts 14a and 14c comprises a flat central surface 36b having an opening of one electric ducted fan 10. This flat central surface 36b is flanked by forward and rearward convex surfaces 38b and 40b. Each of the convex surfaces 38a, 38b, 40a and 40b may be an aerodynamically streamlined surface which forms a respective throat with opposing portions of the surface on which the vehicle is moving. Thus, the contoured bottom surface of the frame 2, the skirts 14a-14c and the inclined surface 111 on which the crawler vehicle 20 is moving define respective channels that allow sufficient air to be sucked up through the corresponding electric ducted fan 10a or 10b to generate a desired suction force. The portion of each channel between the lowest points of the convex surfaces 38a, 38b, 40a and 40b forms respective suction zones 12a and 12b. In the particular embodiment depicted in FIG. 6, the suction zones 12a and 12b are separated by the middle skirt 14a and are in fluid communication with the respective openings in which the electric ducted fans 10a and 10b are installed. These openings may be substantially conical along a lowermost portion thereof to facilitate the flow of air out the suction zone.

It should be appreciated that the under-body surface shape seen in FIG. 6 is an exemplary implementation. The under-body surface may have many different shapes conducive to the flow of air from the front and rear of the crawler vehicle 20 through the space underneath the crawler vehicle 20 and then up through the ducts 9 of the electric ducted fans 10a and 10b.

Although not shown in FIG. 5, the holonomic-motion crawler vehicle 20 can be tethered to a support system by a cable which supplies electrical power to the drive motors 8 and electric ducted fans 10a and 10b on the vehicle. The cable also provides control signals to an onboard computer 44 (see FIG. 14A) which controls the operation of the drive motors 8 and electric ducted fans 10. The onboard computer 44 communicates with respective motor controllers 85 which control the operation of the drive motors 8 and electric ducted fans 10. In accordance with one embodiment, the drive motors 8 are stepper motors. For example, each motor controller 85 may include an indexer (e.g., a microprocessor) configured to generate step pulses and direction signal for a driver which is also part of the motor controller. The driver converts the indexed command signals into the power necessary to energize the motor windings. A stepper motor is an electromagnetic device that converts digital pulses into mechanical shaft rotation. The onboard computer 44 may further include a computer or processor for commanding and orchestrating the motor controllers. The holonomic-motion crawler vehicle 20 may further include a converter box (not shown) mounted to the frame 2. The converter box converts USB signals from the onboard computer 44 into pulse-width-modulated (PWM) signals for controlling the fan motors 13 (see FIG. 14A).

In accordance with an alternative embodiment, the crawler vehicle 20 could be battery-powered, instead of receiving electrical power via a power/signal cord. Also the motor controllers (not shown in FIG. 5, but see motor controllers 85 in FIG. 14A) could be under the control of an onboard computer (not shown in FIG. 5, but see onboard computer 44 in FIG. 14A) rather than a ground-based computer. Alternatively, the motors onboard the crawler vehicle 20 can be controlled via a wireless connection to an off-board controller.

The frame 2 of the crawler vehicle 20 requires some amount of compliance to keep all of the wheels 4 in contact with a surface without slipping. If only three of the four wheels 4 are in contact with the surface and can generate traction, the crawler vehicle 20 will not respond properly to motion inputs. One way to address the wheel contact issue is to build a frame with low torsional stiffness. Another way is to provide suspension for one or more of the wheels.

For a Mecanum-wheeled vehicle to function properly on an inclined or vertical surface, there are additional issues that need to be addressed, specifically, in order to generate the proper vehicle motion, the forces on the wheels need to be sufficient to generate the required traction. If one or more of the wheels begin to slip or stall, the required forces at that corner of the vehicle will not be produced, resulting in an undesired overall vehicle motion.

To ensure sufficient traction, the crawler vehicle 20 may be provided with multiple suction or vacuum creation devices (e.g., electric ducted fans 10a and 10b) attached to respective openings in the frame 2 to create respective suction zones 12a and 12b that can be controlled independently. These independently controlled suction zones 12a and 12b allow the system to control the amount of normal force exerted on the wheels 4a-4d by the contacting surface, which in turn determines the amount of frictional force being exerted in opposition to the weight of the crawler vehicle 20.

As depicted in FIG. 6, the underside of the frame 2 is shaped to provide two suction zones 12a and 12b. Also the frame 2 has low-surface-friction skirts 14a-14c that conform to non-flat surfaces. The electric ducted fans 10a and 10b are installed in respective openings in the frame 2 and are in fluid communication with respective suction zones 12a and 12b defined by the frame bottom surface and the skirts 14a-14c. When the electric ducted fans 10a and 10b are turned on, each electric ducted fan propels air upward, thereby sucking air from the shaped suction zones 12a and 12b respectively. The electric ducted fans 10a and 10b can be independently controlled to apply different suction forces to the confronting surface underneath the respective suction zones 12a and 12b.

Figure 7A:
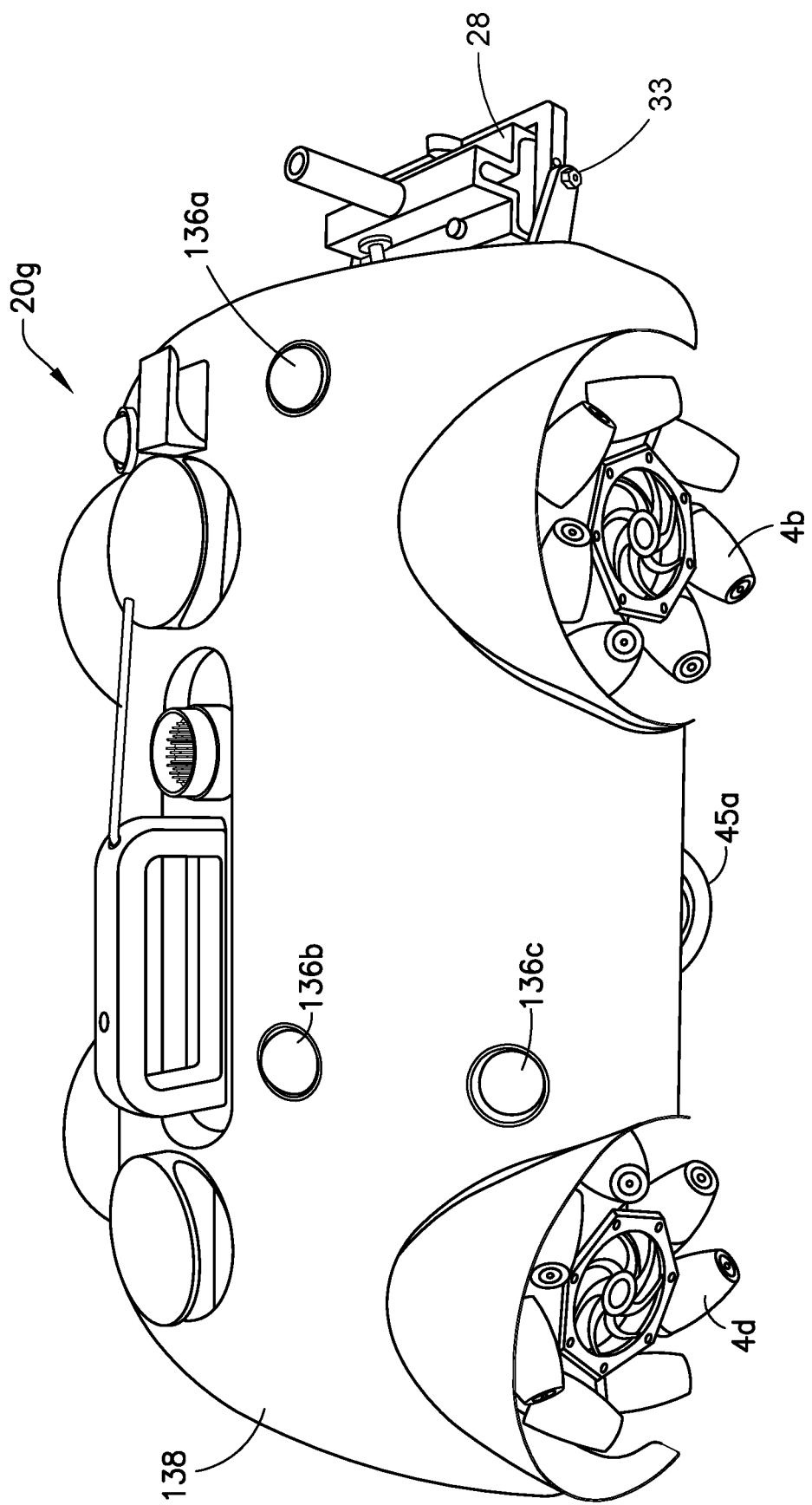
FIG. 7A is a diagram representing a view of a holonomic-motion crawler vehicle that has front and back sets of four vacuum adherence devices in accordance with one embodiment.

FIG. 7A is a diagram representing a view of a holonomic-motion crawler vehicle 20g that uses vacuum adhesion technology and holonomic wheels to adhere and be mobile on non-magnetic surfaces. Crawler vehicle 20g may be equipped with a maintenance tool 28 (such an NDI sensor unit) mounted to a gimbal 33 having two rotational degrees of freedom. The crawler vehicle 20g adheres to non-magnetic surfaces through a dual vacuum assist system along with eight vacuum adherence devices that each form a vacuum seal. These vacuum adherence devices are dragged along the surface when the crawler vehicle 20g is in motion. This adhesion mechanism has no issue navigating or adhering to flat surfaces and can maintain attachment to the surface at all angles.

FIG. 7A shows a holonomic motion crawler vehicle 20g that has four Mecanum wheels 4a-4d (only wheels 4b and 4d are visible in FIG. 7A), four omnidirectional wheels (hereinafter "omni wheels"; only omni wheel 45a is visible in FIG. 7A), two suction zones under the vehicle (not shown), and respective sets of three LED lights 136a-136c on each side (only one set is visible in FIG. 7A). In accordance with the embodiment depicted in FIG. 7A, the LED lights 136a-136c are arranged in an asymmetric pattern on the cover of the crawler vehicle. Each LED light has a generally hemispherical bulb that projects above the cover 138 of the crawler vehicle 20g.

Figure 7B:
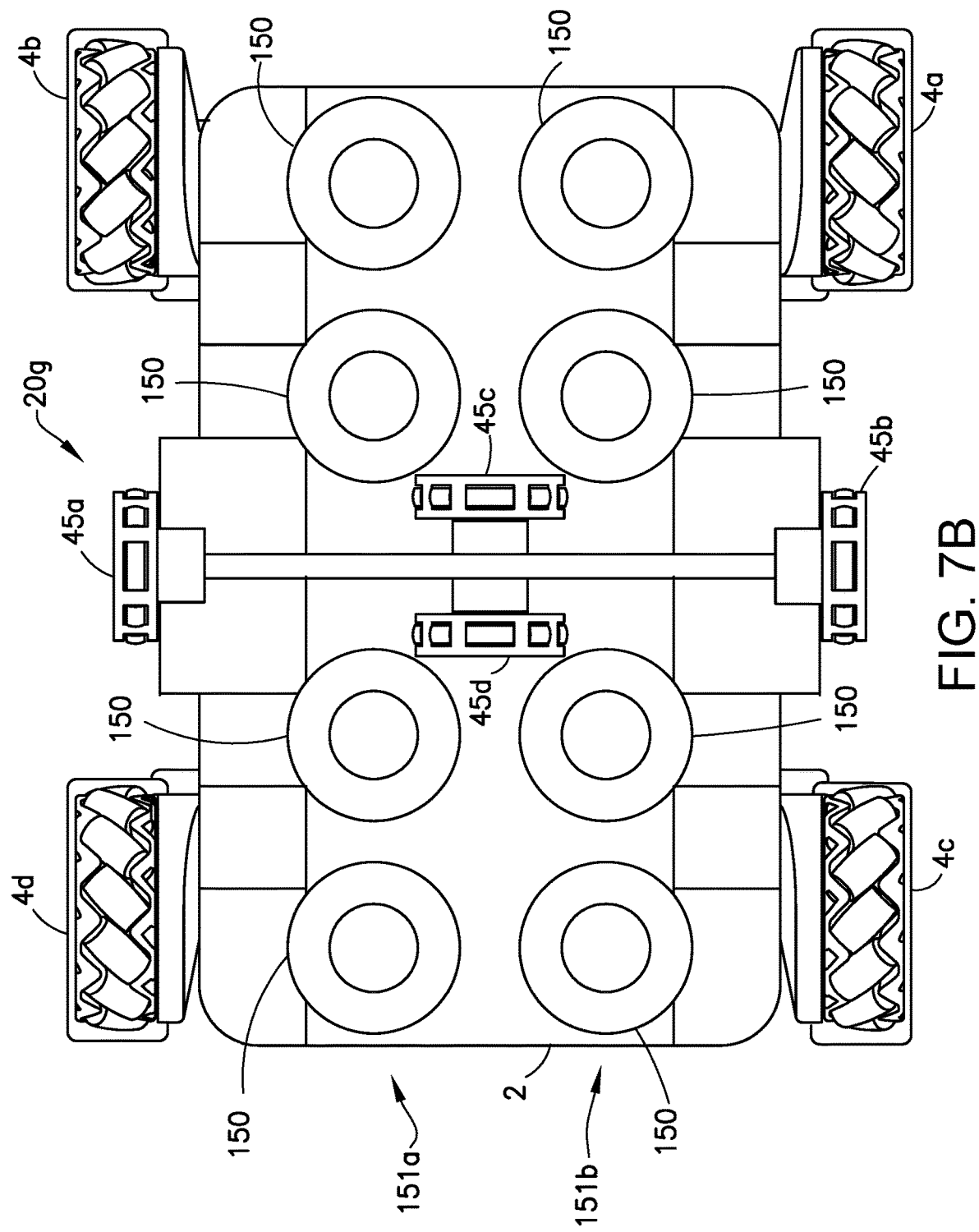
FIG. 7B is a diagram representing a bottom view of the holonomic-motion crawler vehicle depicted in FIG. 7A.

FIG. 7B is a diagram representing a bottom view of the holonomic-motion crawler vehicle depicted in FIG. 7A. The holonomic-motion crawler vehicle 20g has a multiplicity of vacuum adherence devices 150. For example, the multiplicity of vacuum adherence devices 150 may include a first set 151a of four vacuum adherence devices 150 arranged in a first row and a second set 151b of four vacuum adherence devices 150 arranged in a second row which is parallel to the first row. Other configurations for placement of the vacuum adherence devices 150 are possible. The vacuum adherence devices 150 are configured to provide enhanced adherence of the crawler vehicle 20g to the convex curved contours of an external surface 111.

A location tracking system can be provided which is capable of measuring the location of crawler vehicle 20g in absolute coordinates following the completion of a motion that was tracked incrementally, e.g., using rotation encoders 48 (see FIG. 14A) operatively coupled to a set of four omni wheels 45a-45d. One example of an incremental motion measurement system is a dead-reckoning odometry-based system. Any dead-reckoning solution will have measurement inaccuracies due to small errors that build up over time. These can be caused by systematic errors in the device or disruptions caused by unexpected changes in the environment.

This device depicted in FIG. 7B has a four-omni wheel, perpendicular, double-differential configuration. Respective rotation encoders 48 measure rotation of the omni wheels 45a-45d. As the omni wheels 45a-45d roll on a surface, the rotation encoders 48 send encoder pulses representing respective encoder counts to an operations control center via a power/signal cable (not shown in FIGS. 7A and 7B) after each incremental rotation of each omni wheel. Each rotation encoder 48 will output an encoder count proportional to the angle of rotation of a respective omni wheel. These encoder pulses will be received by a computer system (see, e.g., onboard computer 44 depicted in FIG. 14A) that computes the X and Y coordinates of the device.

The control system stops the device when the counts of encoder pulses indicate that the device has arrived at the desired location. The current location of the stopped device can then be checked to determine to what extent it may deviate from the desired location. In accordance with the teachings herein, corrections can be made to the relative motion measurements by acquiring accurate, absolute measurements at lower update rates. This absolute measurement process (performed while the target object is stopped) can be integrated into a relative motion measurement system running at higher update rates, which acquires relative motion measurements while the target object is moving. In accordance with one embodiment disclosed hereinafter, a lower-update-rate local positioning system-based process provides corrections to a higher-update-rate odometry system.

A process for absolute measurement of the position of the crawler vehicle 20g is implemented by acquiring an image with the LED lights 136a-136c off and then turning the lights on and acquiring another image (or vice versa). Two variations of the process have been developed: one in which all the lights are turned on at the same time, and another in which the lights are turned on in a specific sequence. The first way is slightly faster. It employs a light pattern on the surface of the target object that is asymmetric. The second method is more robust in differentiating between the lights and does not require the light pattern to be asymmetric. The absolute measurement system (not shown in the drawings) includes a laser range meter mounted to a pan-tilt unit that produces position and orientation data at finite time intervals.

Figure 8A:
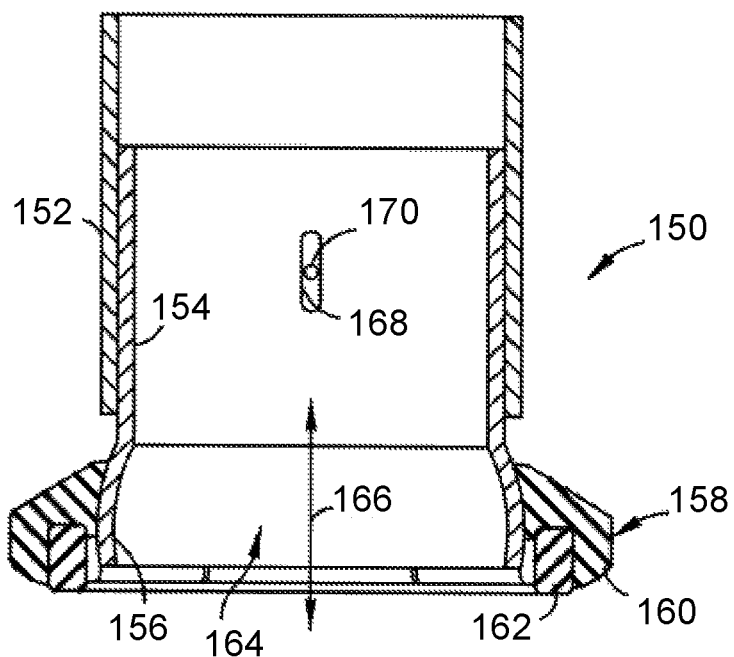
FIG. 8A is a diagram representing a cross-sectional view of a vacuum adherence device in accordance with one implementation.

FIG. 8A is a diagram showing a cross-sectional view of a vacuum adherence device 150 in accordance with one implementation. This vacuum adherence device 150 comprises a circular cylindrical sleeve housing 152 and a sleeve 154 having a circular cylindrical portion which is axially slidable along a center axis 166 inside the sleeve housing 152. The sleeve 154 further comprises bearing portion 156 having an outer spherical bearing surface having a center point located along the center axis 166. The bearing portion 156 may be integrally formed with the aforementioned circular cylindrical portion of sleeve 154. The vacuum adherence device 150 further comprises a pivotable seal assembly 158 comprising a socket ring 160 that holds a seal 162. The socket ring 160 also has an inner spherical bearing surface which is concentric with and pivotably coupled to the outer spherical bearing surface of bearing portion 156 of sleeve 154. The pivot point of the socket ring 160 is collocated with the center point of the outer spherical bearing surface of bearing portion 156 of sleeve 154.

The pivotable seal assembly 158 is configured to rotate relative to the sleeve 154 about the pivot point to at least partially conform to a shape of a confronting surface. The vacuum adherence device 150 can adhere to such a confronting surface when air is drawn into a channel 164 formed in part by the channel of sleeve housing 152, in part by the channel of sleeve 154, and in part by the opening in the seal 162. The pivotable seal assembly 158 is configured to rotate relative to the sleeve 154 independently of translational movement of the sleeve 154 in a direction parallel to the center axis 166 within the sleeve housing 152. The amount of rotation of pivotable seal assembly 158 may be limited by the size and/or shape of the outer spherical bearing surface of the bearing portion 156 of sleeve 154.

Although not shown in FIG. 8A, the vacuum adherence device 150 preferably comprises a spring arranged to urge the sleeve 154 to extend out of the sleeve housing 152 by downward (as seen in the view of FIG. 8A) sliding along the center axis 166. This sliding movement may be restricted to within a selected range of movement. However, sleeve 154 may "float" freely relative to sleeve housing 152 within this selected range of movement. This restriction of the translational motion of sleeve 154 can be implemented by providing a slot 168 in the wall of the circular cylindrical portion of sleeve 154 and by providing a pin 170 which extends radially inward from the wall of sleeve housing 152 and into the slot 168. The pin 170 may also be used to hold sleeve 154 inside sleeve housing 152. The length of slot 168 restricts the sliding movement of sleeve 154 relative to sleeve housing 152.

The channel 164 is in fluid communication with a control valve (not shown in FIG. 8A), which control valve is in turn in flow communication with a vacuum pump (also not shown in FIG. 8A). The vacuum pump, control valve, channel 164, and connecting conduits form a vacuum system which is configured to draw air into the channel 164 such that a vacuum adherence is formed between the pivotable seal assembly 158 and a confronting surface. The vacuum adherence is the result of a vacuum pressure generated inside the channel 164. When the flow of air is reversed, air provided by the pump flows through any gap between the seal 162 and the confronting external surface 111. The height of the gap may vary along the periphery of the seal 162. This gap height depends on the shape of the confronting surface and the degree of rotation of the seal 162 to conform to that shape. The seal 162 may be formed of any one of a number of different materials. For example, seal 162 may comprise silicone rubber or other elastomeric material, a viscoelastomeric material, or some other suitable flexible material.

Figure 8B:
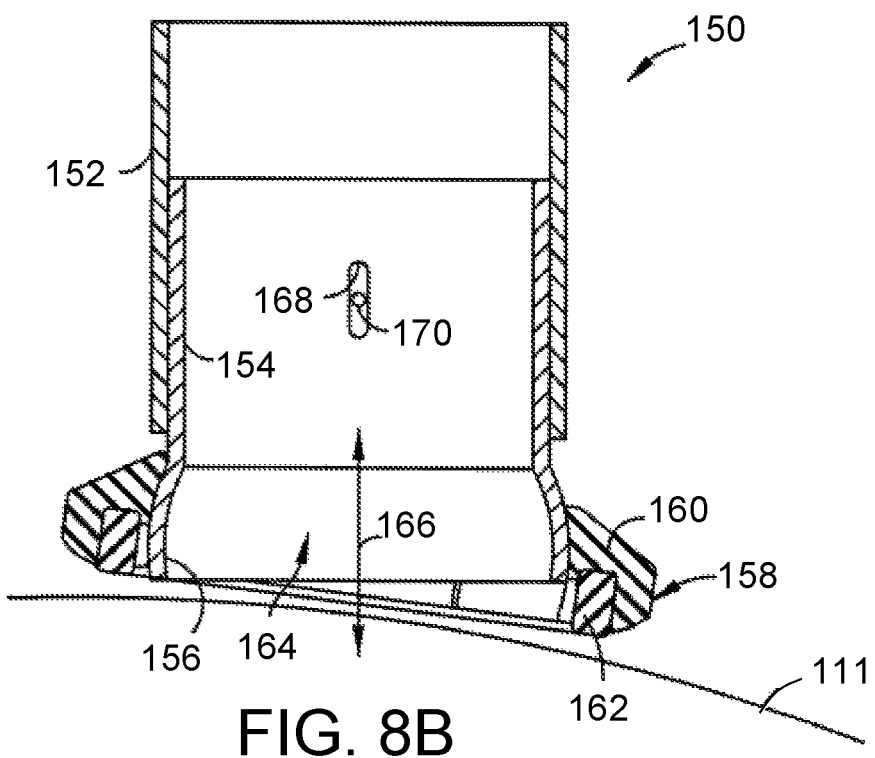
FIG. 8B is a diagram representing a cross-sectional view of the vacuum adherence device depicted in FIG. 8A adhered to a non-planar blade surface. The air gap between the vacuum adherence device and the non-planar surface has been exaggerated for the purpose of illustration.

FIG. 8B shows a cross-sectional view of the vacuum adherence device 150 depicted in FIG. 8A adhered to a convex curved external surface 111. The air gap between the vacuum adherence device 150 and the external surface 111 has been exaggerated for the purpose of illustration. The air gap may function as an air bearing that holds the pivotable seal assembly 158 close to the external surface 111, while reducing static friction to within selected tolerances. In other words, the air gap allows pivotable seal assembly 158 to "float" above the external surface 111 while maintaining vacuum adherence between pivotable seal assembly 158 and external surface 111. Further, the air gap allows pivotable seal assembly 158 to be moved over the external surface 111 with a reduced amount of static friction and without causing undesired effects to the surface.

In one embodiment, the seal 162 may be corrugated in such a way as to allow small channels for airflow between the seal 162 and the external surface 111. In some instances, these corrugated channels have been shown to promote vacuum on surfaces of uneven profile or varying surface roughness. In accordance with this embodiment, the corrugations may comprise a low-friction material that further induces sliding such that base motion will be enabled, yet airflow is ensured by the corrugated channels.

The ability to control the respective suction forces produced allows the load on the wheels 4a-4d in the direction perpendicular to the surface normal to be controlled, which in turn provides the ability to increase the lateral force on the wheels 4a-4d through the equation $F=\mu N$, where F is the lateral force due to friction, $\mu$ is the coefficient of friction, and N is the normal force.

Figure 9:
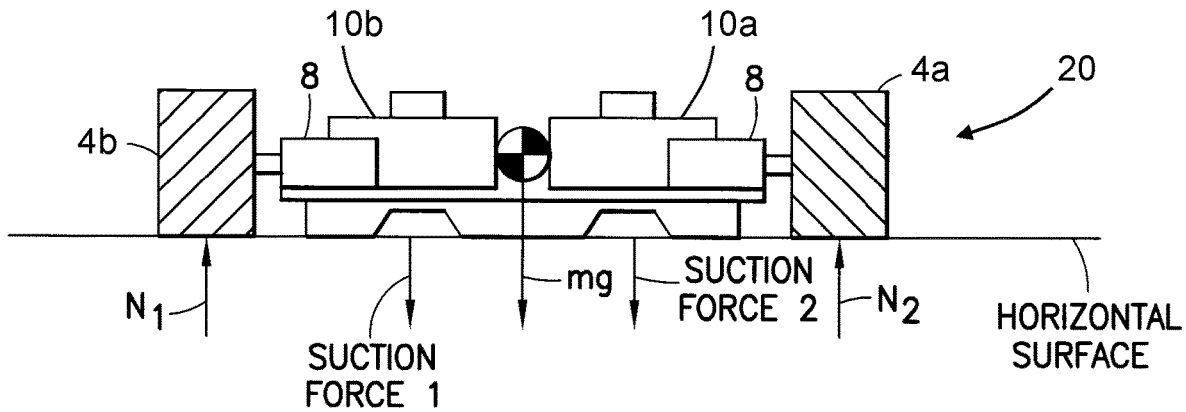
FIGS. 9 and 10 are diagrams representing front views of portions of a crawler vehicle that has left and right vacuum adherence devices and further showing the forces exerted by a horizontal surface (see FIG. 9) and an inclined surface (see FIG. 10) on the Mecanum wheels of the crawler vehicle when the Mecanum wheels 4a and 4c on one side are at one elevation and the Mecanum wheels 4b and 4d on the other side are at another elevation.
Figure 10:
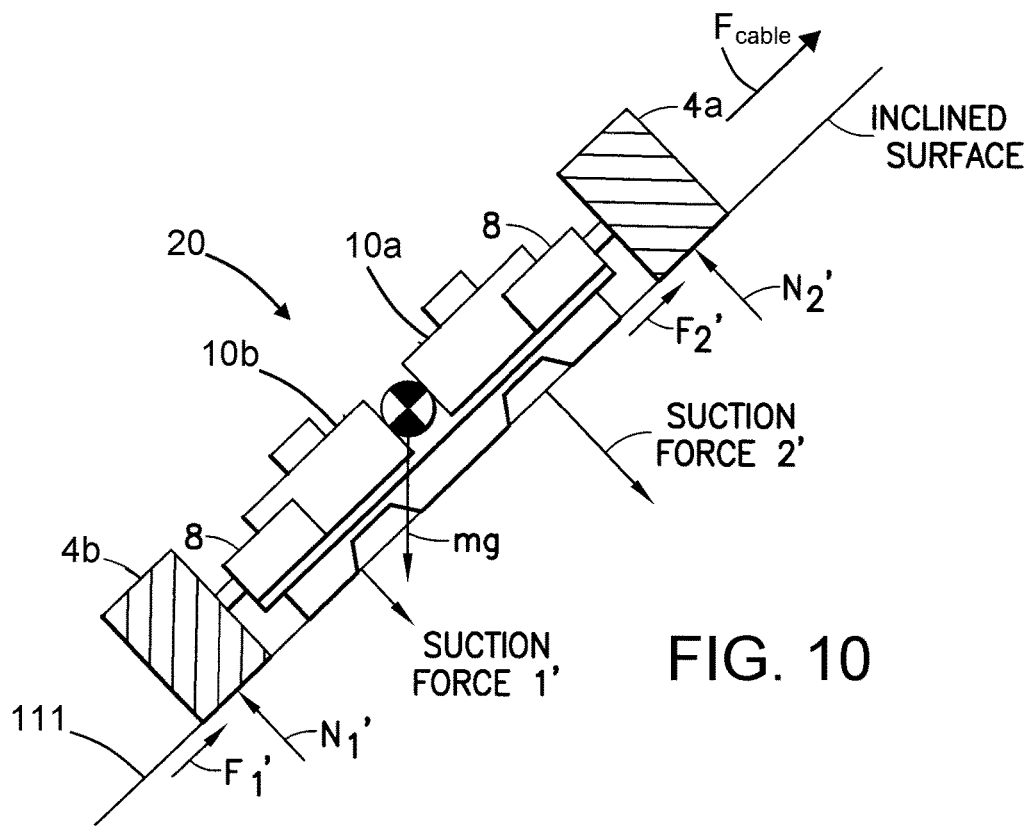

FIG. 9 is a diagram showing the forces exerted by a horizontal surface on the Mecanum wheels 4a-4d of the crawler vehicle 20 depicted in FIGS. 5 and 6. (The principles depicted in FIGS. 9 and 10 are equally applicable to the crawler vehicle 20g depicted in FIGS. 7A and 7B.) When the suction forces generated by the respective electric ducted fans 10a and 10b are equal, the normal forces on the Mecanum wheels 4a-4d on the left- and right-hand sides of the vehicle are equal, i.e., $N_1=N_2$.

FIG. 10 is a diagram showing the forces exerted by an inclined surface 111 on wheels 4a and 4c (wheel 4c is directly behind wheel 4a and not visible in FIG. 10) and on wheels 4b and 4d. The speed of the electric ducted fans 10a and 10b can be controlled to produce different suction forces on opposite sides of the crawler vehicle. When the suction force generated by the electric ducted fan 10 disposed at a relatively higher elevation is greater by a certain amount than the suction force generated by the electric ducted fan 10 disposed at a relatively lower elevation, the frictional and normal forces exerted by the inclined surface 111 on the upper pair of wheels 4a and on the lower pair of wheels 4b can be equalized, i.e., $F_1'=F_2'$ and $N_1'=N_2'$. Thus the suction in the upper zone can be increased relative to that of the lower zone, resulting in an increase in the normal load on the two upper Mecanum wheels 4a and 4c. The respective electric ducted fans 10a and 10b are controlled as a function of the angle of inclination of the inclined surface 111 on which the vehicle is situated. The balance between the zones 12 can be controlled by using a sensor (not shown), such as an electronic inclinometer sensor, installed on the frame 2 to measure the relative angle between the frame 2 and the gravity vector mg (where m is the mass of the crawler vehicle 20). The electronic inclinometer sensor returns angle of inclination data to the controller, which uses the data for controlling the electric ducted fans 10. Thus slippage of the crawler vehicle will not occur so long as the total gravity-compensating force $F_1'+F_2'$ is greater than or equal to the lateral component (parallel to the inclined surface 111) of the gravitational force vector mg, where m is the total mass of the crawler vehicle 20 and the length of cable (not shown in FIG. 10) between the crawler vehicle 20 and the cable spool 52, and g is acceleration due to gravity.

Although not shown in FIG. 10, the frame 2 of the crawler vehicle 20 may be fastened or hooked onto one end of a cable 22, as depicted in FIGS. 3A-3C. The arrow labeled $F_{cable}$ seen in FIG. 10 represents an additional gravity-compensating tensile force being exerted by a cable from which the crawler vehicle 20 is suspended. Thus slippage of the crawler vehicle will not occur so long as the total compensation force $F_1'+F_2'+F_{cable}$ is greater than or equal to the lateral component of the gravitational force vector mg. Due to the force $F_{cable}$ applied by the cable, the magnitudes of the lateral frictional forces $F_1'$ on the two upper Mecanum wheels 4a and 4c and $F_2'$ on the two lower Mecanum wheels 4b and 4d may be reduced, which in turn reduces the magnitudes of the suction forces needed to prevent downward slippage of the crawler vehicle 20. Because smaller forces may be employed, the maximum power and the accompanying mass of the fan motors 13 may be reduced, thereby reducing the mass and cost of each crawler vehicle. Also, if the crawler vehicle 20 is battery-powered, the anti-gravity assistance provided by a tensioned cable attached to the frame 2 reduces the rate at which electric power is consumed, which in turn extends the operating time until the battery should be recharged.

With a holonomic-motion system that can move on level, inclined and vertical surfaces, general-purpose motion control is enabled for inspection and other types of applications. For the types of inspection applications envisioned, having holonomic motion control allows the system operator to use efficient path planning.

While making a rotation maneuver as described above on an inclined or vertical surface, the suction in the multiple zones under the Mecanum-wheeled vehicle will be automatically changed by the control software or hardware as the wheel loads in the normal direction change. The change in suction is performed in order to achieve balanced loads on the wheels. Suction in the various zones may also change as the vehicle moves over a curved surface. In some embodiments, the relative amounts of suction in each zone are controlled by using data from a gravity vector sensing device, such as an inclinometer. In other embodiments, load sensors for each wheel may be used to determine the required amount of suction. In addition, this information may be used to calculate the angle of rotation of the cable spool 52 on the crawler vehicle 20a (see FIGS. 1A and 1B) that will produce a desired additional gravity-compensating force $F_{cable}$.

The crawler vehicles 20 disclosed herein have multiple applications. In accordance with one application, the crawler vehicle 20 carries an eddy-current sensor, but other types of sensors, such as ultrasonic sensors can be carried. The sensor may be a single sensing element or an array of sensing elements. Cameras, tools, painting equipment, a laser marking system, a robotic arm manipulator, or other devices could also be carried by the platform.

Figure 11A:
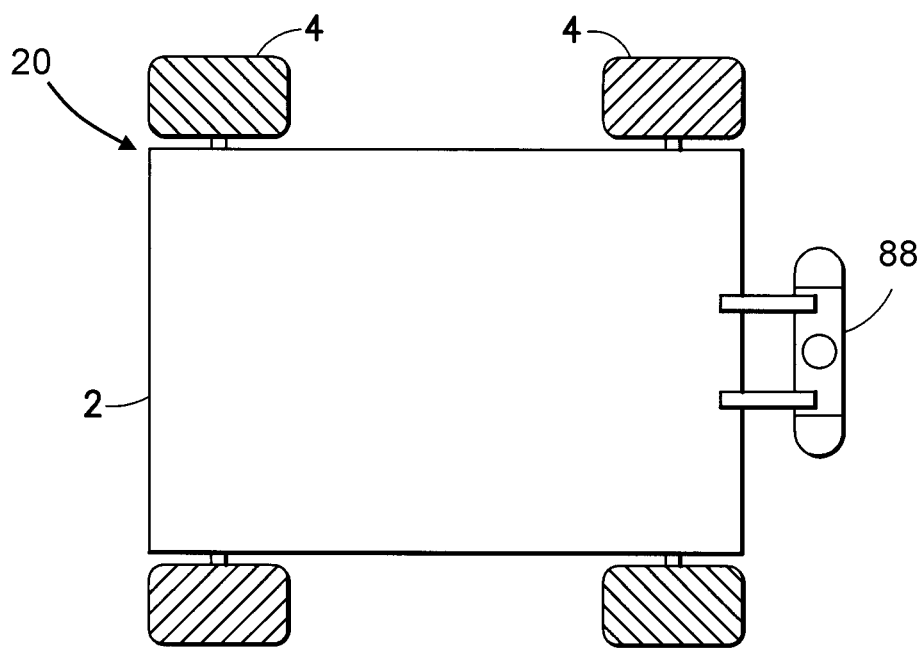
FIG. 11A is a diagram representing a top view of a Mecanum-wheeled frame of a crawler vehicle having a fixed NDI scan head attached to one end thereof.

FIG. 11A shows a version of the crawler vehicle 20 with a fixed ultrasonic transducer array 88 mounted to one end of the frame 2. The ultrasonic transducer array 88 can scan an underlying surface in the direction in which the vehicle crawls. The ultrasonic sensor may be a single ultrasonic sensing element or an array of ultrasonic sensing elements.

Figure 11B:
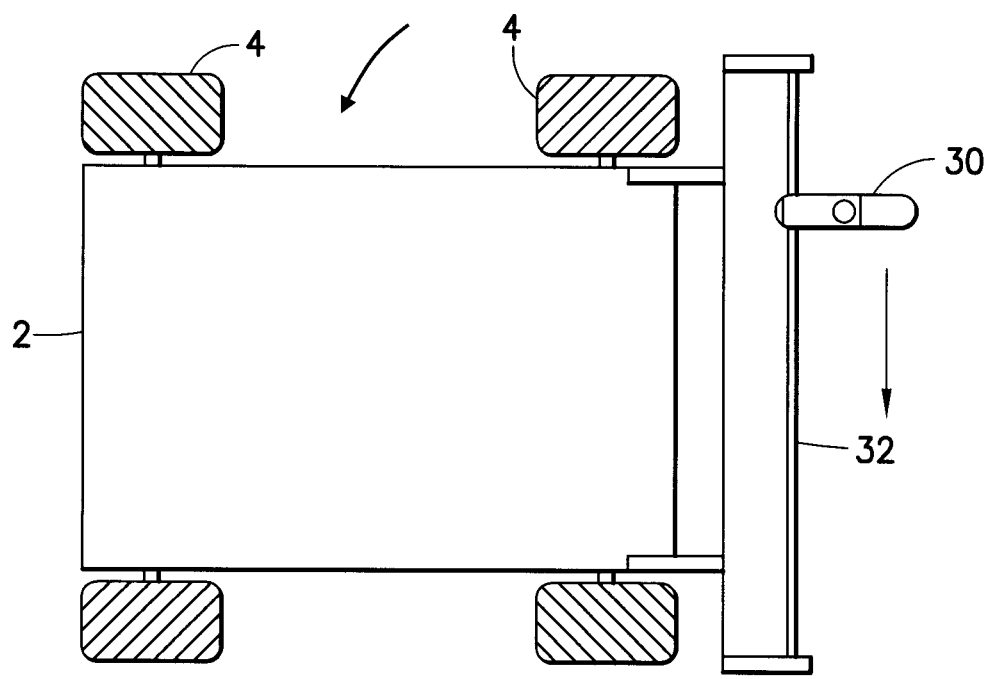
FIG. 11B is a diagram representing a top view of a Mecanum-wheeled frame of a crawler vehicle having a reciprocating NDI scan head mounted to one end thereof.

FIG. 11B shows another version of the crawler vehicle 20 with a scanning ultrasonic sensor unit 30 (e.g., a linear or curved ultrasonic transducer array) mounted on a linear track 32 fixed to one end of the frame. The ultrasonic sensor unit 30 can slide back and forth along the linear track 32, scanning a transverse area of underlying surface while the crawler vehicle 20 is stationary. Again, the ultrasonic sensor may be a single sensing element or an array of sensing elements. The vehicle can be moved forward in increments, pausing after each incremental move to allow the ultrasonic sensor unit 30 to scan along a transverse line. Alternatively, a controller can be programmed to control the movements of the crawler vehicle 20 and the scanning head to provide other patterns for scanning a surface area.

FIGS. 12A-12D are diagrams representing top views of a holonomic-motion crawler vehicle 20e in accordance with an alternative embodiment which has a passive connection that pivots about an axis of rotation R1 (see FIG. 13) that is perpendicular to the frame 2 and passes through the center of mass of the crawler vehicle 20e, with an arm 132a that is shaped to allow the cable force to project through the center of mass of the crawler vehicle 20e (but not interfere with the crawler or the sensor payload). More specifically, crawler vehicle 20e includes: a center pivot 134a that is rotatably coupled to the frame 2 and rotates about the axis of rotation R1; an arm 132a having one end affixed to the center pivot 134a, a turret base 47 affixed to the other end of the arm 132a; a turret 46 rotatably coupled to the turret base 47; and a cable 22 having one end attached or tied to the turret 46. FIGS. 12A through 12D depict the crawler vehicle 20e in respective angular positions at respective instants of time during counterclockwise rotation of the frame 2 about axis of rotation R1.

Figure 13:
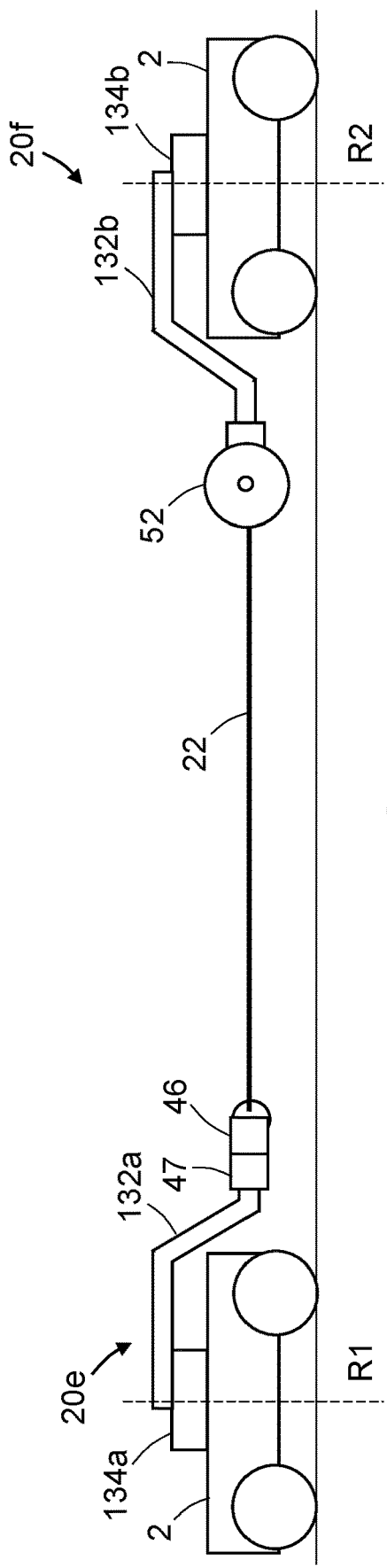
FIG. 13 is a diagram representing a side view of a pair of holonomic-motion crawler vehicles having a passive connection of the type depicted in FIGS. 12A-12D.

FIG. 13 is a diagram representing a side view of a pair of holonomic-motion crawler vehicles 20e and 20f. Crawler vehicle 20f includes: a center pivot 134b that is rotatably coupled to the frame 2 and rotates about a vertical axis R2 that passes through the center of mass of the crawler vehicle 20f; an arm 132b having one end affixed to the center pivot 134b, and a cable spool 52 that is rotatably coupled to the other end of the arm 132b. A cable 22 has one end wound on the spool 52 and the other end attached or tied to the turret 46 of the crawler vehicle 20e. Although crawler vehicles 20e and 20f are shown on a flat surface in FIG. 13, they may be placed on an aircraft fuselage 100 in a manner similar to placement of crawler vehicles 20a and 20b depicted in FIGS. 1A and 1B. During the performance of a maintenance operation, the movement of tool-equipped crawler vehicle 20b may be tracked using any one of a variety of crawler vehicle position measurement systems. Knowing where each crawler vehicle is located at any time is important. For example, in cases where the maintenance tools are NDI sensor units, the locations of the NDI sensor units are correlated with the acquired NDI sensor data to ensure full coverage and potentially create an NDI map of the external surface 112 of the aircraft fuselage 100 (or other body).

(a) The crawler vehicle 20b may be equipped with omni-directional wheels and omni wheel rotation encoders to enable vertical and horizontal movements to be tracked.

(b) Laser-based methods may be used. For example, a laser-based crawler vehicle position measurement system may include laser range meters mounted on a cart and aimed at optical targets mounted on each crawler vehicle 20a and 20b.

(c) Camera- or video-based methods may be used, such as motion capture using optical targets mounted on each crawler vehicle 20a and 20b.

FIG. 14A is a block diagram identifying some components of a holonomic-motion crawler vehicle that is equipped with both a cable spool 52 and a carriage-mounted maintenance tool (only the carriage 34 is shown in FIG. 14A) in accordance with one embodiment. This spool- and tool-equipped holonomic-motion crawler vehicle includes a frame 2 having a set of four wheel axles 6 fixedly coupled thereto. A set of four Mecanum wheels 4 are rotatably coupled to respective wheel axles 6. A set of four drive motors 8 are configured to respectively drive rotation of the Mecanum wheels 4 in response to control signals received from respective motor controllers 85. The motor controllers 85 in turn receive commands from an onboard computer 44. The onboard computer 44 is programmed to receive operational instructions from a ground-based control computer via a transceiver 80 and then issue commands in the formats recognized by the motor controllers 85. In addition, a pair of electric ducted fans 10a and 10b are incorporated in the frame 2. (In alternative embodiments, the number of electric ducted fans may be different than two.) Each electric ducted fan 10a and 10b includes a fan 11 which is rotatable about an axis, a duct 9 surrounding the fan, and an electric fan motor 13 which drives the fan 11 to rotate in response to control signals received from the onboard computer 44. The holonomic-motion crawler vehicle partly represented in FIG. 14A further includes a spool axle 50 fixedly coupled to the frame 2, a cable spool 52 rotatably coupled to the spool axle 50, and a spool motor 54 configured to drive rotation of the cable spool 52 in response to control signals received from the onboard computer 44. In addition, the holonomic-motion crawler vehicle partly represented in FIG. 14A includes a linear track 32 mounted to the frame 2. More specifically, the linear track 32 may be translatably coupled to a motorized linear slide 31 of the type depicted in FIG. 3B. A carriage 34, to which the maintenance tool 28 (not shown in FIG. 14A) is fixedly coupled, is translatably coupled to the linear track 32 and driven to translate laterally along the linear track 32 by a carriage motor 42 (by way of a gear train not shown) in response to control signals received from the onboard computer 44.

In addition, the onboard computer 44 may be programmed to track the location of the crawler vehicle using differential odometry. (In this context, the term "location" includes position in a three-dimensional coordinate system and orientation relative to that coordinate system.) For this purpose, the crawler vehicle components depicted in FIG. 14A include a set of omni-directional wheels 45 with respective rotation encoders 48. The encoded data output by the rotation encoders 48 is received by the onboard computer 44. In accordance with the teachings herein, a frame 2 of a crawler vehicle may have a set of four omni-directional wheels 45 for tracking vehicle motion and a set of four Mecanum wheels 4 for driving the vehicle under the control of the onboard computer 44. More details regarding such a subsystem for differential odometry can be found in U.S. Pat. No. 9,470,658.

All of the motors identified in FIG. 14A are mounted to the frame 2. The onboard computer 44 is configured to control operation of the motors so that each holonomic-motion crawler vehicle performs a maintenance operation in a respective area of the surface of the aircraft fuselage 100.

The onboard computer 44 receives data from sensor(s) 82. The sensor(s) 82 may, e.g., include an inclinometer that provides data representing the angle of inclination of the holonomic-motion crawler vehicle or respective sensors that provide data representing the loads on each wheel. The onboard computer 44 processes that information to: (1) control the drive motors 8 as a function of the position/orientation data and (2) control the electric ducted fans 10a and 10b as a function of the sensor data as disclosed in U.S. Pat. No. 8,738,226.

The onboard computer 44 is also programmed to control operation of the spool motor 54 to provide anti-gravity assistance via a cable to another crawler vehicle as described in detail above. For example, the onboard computer 44 may be programmed with a "position control" mode in which there is direct feedback between the rotation encoders 48 (or some other length-based measurement sensor) and the spool motor 54. This drives the spool motor 54 to rotate to produce the desired length of cable 22 using a feedback control mode such as Proportional-Integral-Derivative (PID) control.

In accordance with one alternative embodiment, another way that the motorized winch can be setup to work is to use a "torque control" or "force control" mode. In this case the motor power is pre-set to produce a specific amount of torque—which is equivalent to a specific amount of force on the cable 22. This is a simpler mode than the "position control" mode discussed above. The torque control allows the desired load to be set and kept that way, while the crawler vehicle 20b produces all of the desired motion control for the scanning tasks.

In accordance with a further alternative embodiment, a passive winch with a constant force tensioning spring (such as the tensioning spring 86 identified in FIG. 18A) can be used. A passive winch produces a similar result to the "torque control" mode mentioned above, with the spring load pre-set. The tensioning spring 86 exerts a gravity-compensating tensile force without any power applied.

The advantage of torque control over a tensioning spring is that the operator can change the amount of power supplied to the spool motor 54 when conditions demand, such as if the slope of the surface changes and less or more torque is wanted, or if additional cable has been paid out and the torque should be increased to compensate for the extra weight of the cable. Also, the control mode of the spool motor 54 can be easily changed to an active or manual control mode if the operator needs to move the crawler vehicle in a different way for some reason (such as extricate the crawler vehicle from a jam if the crawler vehicle becomes stuck).

It is also possible to have a motorized winch with passive spring, which would have all the advantages of the motorized winch, with passive gravity compensation to reduce the power needed to run the system.

In general, gravity compensation will be determined based on the weights of the crawler vehicle and length of paid-out cable and the slope of the inclined surface 111. To calculate the total compensation force, the following equation may be used:

$$F_1' + F_2' + F_{cable} = (m_{cv} + m_{cable}) * g * \sin(\text{angle})$$

where $m_{cv}$ is the mass of the crawler vehicle, $m_{cable}$ is the mass of the length of cable between the crawler vehicle 20b and the cable spool 52, g is acceleration of gravity, and sin(angle) is the sine of the angle of the inclined surface relative to a horizontal plane (where a vertical wall would be 90 degrees and sin(90)=1).

The mass of the paid-out length of cable 22 changes as more cable is paid out, so for the passive winch device, the operator may set the spring tension for some average paid-out cable length. For the motor-based torque control method, the operator may adopt a torque change based on the length of the cable that has been paid out (if the optional length measurement sensor is used).

Referring back to FIG. 1A, it should be appreciated that the crawler vehicle 20a may have all of the components depicted in FIG. 14A or may have all of the components depicted in FIG. 14A except for the linear track 32, carriage 34 (with a maintenance tool mounted thereto) and carriage motor 42. In contrast, the crawler vehicle 20b has all of the components depicted in FIG. 14A except for the spool axle 50, cable spool 52 and spool motor 54.

Figure 14B:
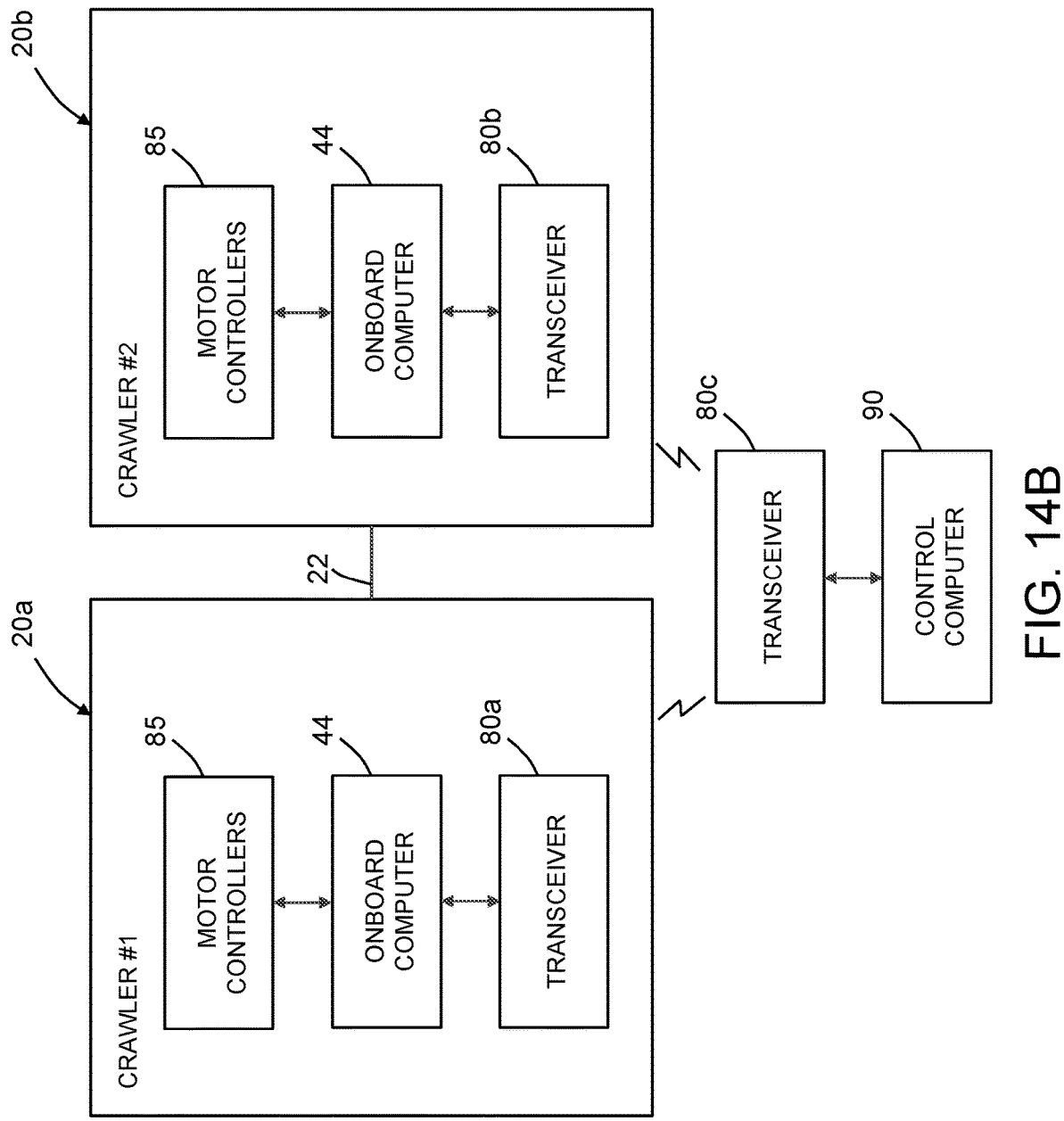
FIG. 14B is a block diagram identifying some components of a gravity-compensating system in which two cable-connected crawler vehicles vacuum adhered to a body (e.g., an aircraft fuselage) communicate wirelessly with a ground-based control computer.

FIG. 14B is a block diagram identifying some components of a gravity-compensating system in which two cable-connected crawler vehicles 20a and 20b, vacuum adhered to a body (e.g., an aircraft fuselage 100), communicate wirelessly with a ground-based control computer 90. The control computer 90 is programmed to output operational instructions in digital format to a transceiver 80c, which converts the digital data into modulated waveforms which are then broadcast as radiofrequency signals by an antenna (not shown in FIG. 14B). The broadcast radiofrequency signals are received by respective antennas (not shown in FIG. 14B) mounted on the crawler vehicles 20a and 20b and the resulting modulated waveforms are demodulated by transceivers 80a and 80b, which respectively output digital data representing the operational instructions to respective onboard computers 44. The onboard computers 44 then send commands to the motor controllers 85 that cause the crawler vehicles 20a and 20b to operate in accordance with the operational instructions.

Figure 15:
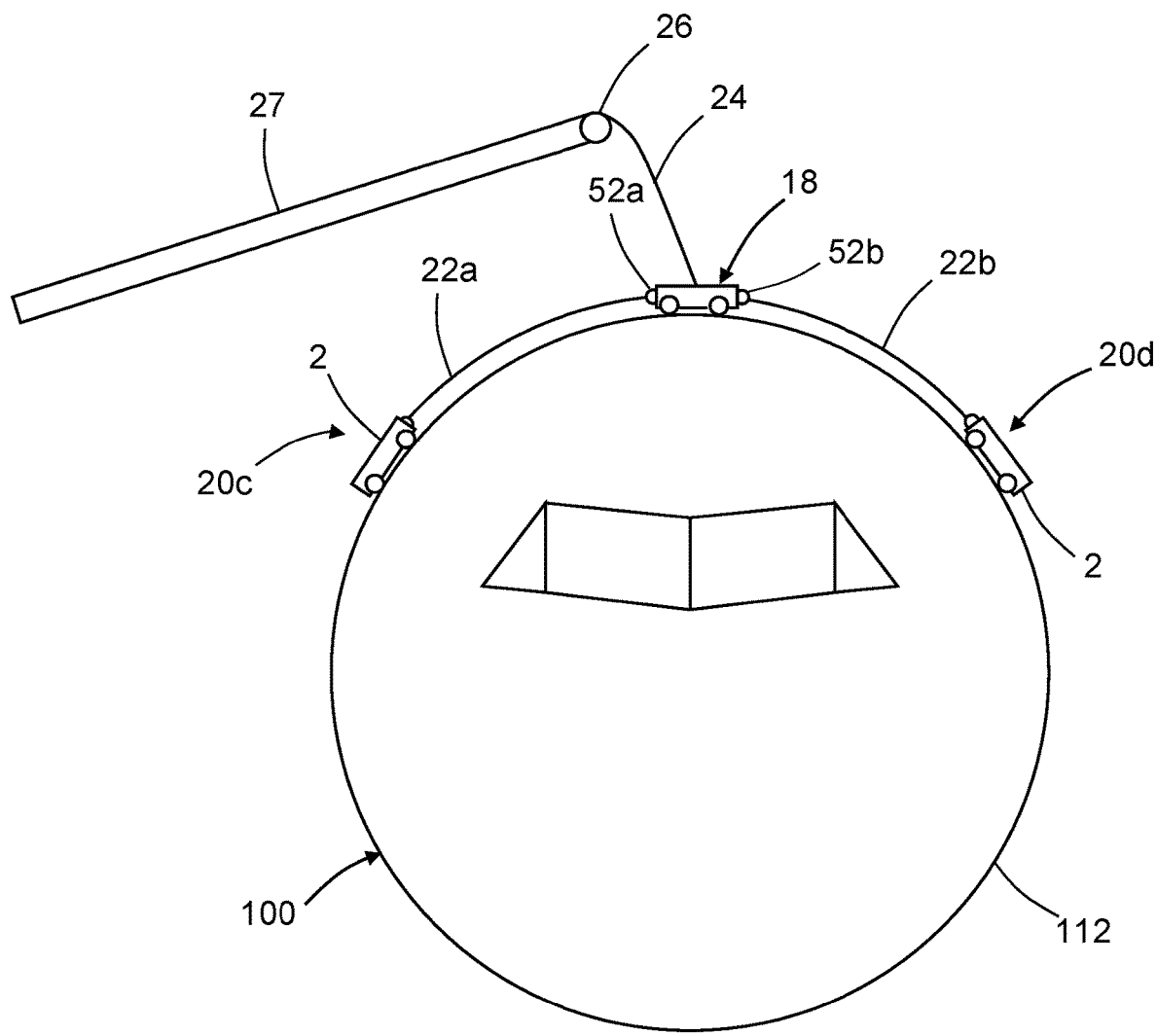
FIG. 15 is a diagram representing a front end view of an aircraft fuselage at an instant in time during an automated maintenance procedure performed using a gravity-compensating system that includes a first vacuum-adhered crawler vehicle suspended by a primary umbilical cable from a boom and second and third vacuum-adhered, tool-equipped crawler vehicles connected to the first vacuum-adhered crawler vehicle by respective secondary cables in accordance with a second embodiment.

FIG. 15 is a diagram representing a front end view of an aircraft fuselage 100 at an instant in time during an automated maintenance procedure performed using a gravity-compensating system in accordance with a second embodiment. The gravity-compensating system includes a spool-equipped crawler vehicle 18 suspended by an umbilical cable 24 from a boom 27 and vacuum adhered to an external surface 112 of the aircraft fuselage 100. The crawler vehicle 18 may be configured to move holonomically. The system depicted in FIG. 15 further includes tool-equipped crawler vehicles 20c and 20d connected to the spool-equipped crawler vehicle 18 by respective cables 22a and 22b and vacuum adhered to the external surface 112 of the aircraft fuselage 100 on opposite sides thereof. The crawler vehicles 20c and 20d are also configured to move holonomically. It should be appreciated that the cables 22a and 22b, which are depicted in FIG. 15 as being at a constant distance from the external surface 112, in actuality may contact the external surface 112 in an area midway between the crawler vehicles connected by the cable.

Still referring to FIG. 15, a pulley 26 is rotatably coupled to a distal end of the boom 27 to facilitate pay-out and take-up of the umbilical cable 24 in the manner described in U.S. Pat. No. 9,410,659. A power/signal cord (not shown in FIG. 15) may be attached to or incorporated in the umbilical cable 24 for enabling a ground-based control computer to communicate with a computer onboard the crawler vehicle 18 and for supplying electrical power to the crawler vehicle 18. Similarly, respective power/signal cords (not shown in FIG. 15) may be attached to or incorporated in the cables 22a and 22b for enabling the computer onboard the crawler vehicle 18 to communicate with the computers onboard the crawler vehicles 20c and 20d and for supplying electrical power to the crawler vehicles 20c and 20d.

In accordance with the embodiment depicted in FIG. 15, the crawler vehicle 18 has two cable spools 52a and 52b, one cable spool 52a having one end of the cable 22a attached thereto and some portion of the cable 22a wound thereon, while the other cable spool 52b has one end of the cable 22b attached thereto and some portion of the cable 22b wound thereon. The other end of the cable 22a is attached to the frame 2 of the crawler vehicle 20c, while the other end of the cable 22b is attached to the frame 2 of the crawler vehicle 20d. In accordance with the arrangement depicted in FIG. 15, the computer onboard the crawler vehicle 18 may control the motor-driven rotation of the respective cable spools 52a and 52b to concurrently apply additional gravity-compensating forces to the crawler vehicles 20c and 20d via respective cables 22a and 22b in the manner described above. In an alternative embodiment, the cable spools 52a and 52b on crawler vehicle 18 may be torqued using tensioning springs. Thus the crawler vehicle 18 only manages the cables 22a and 22b and acts as a power source and communication relay with respect to the tool-equipped crawler vehicles 20c and 20d.

Figure 16:
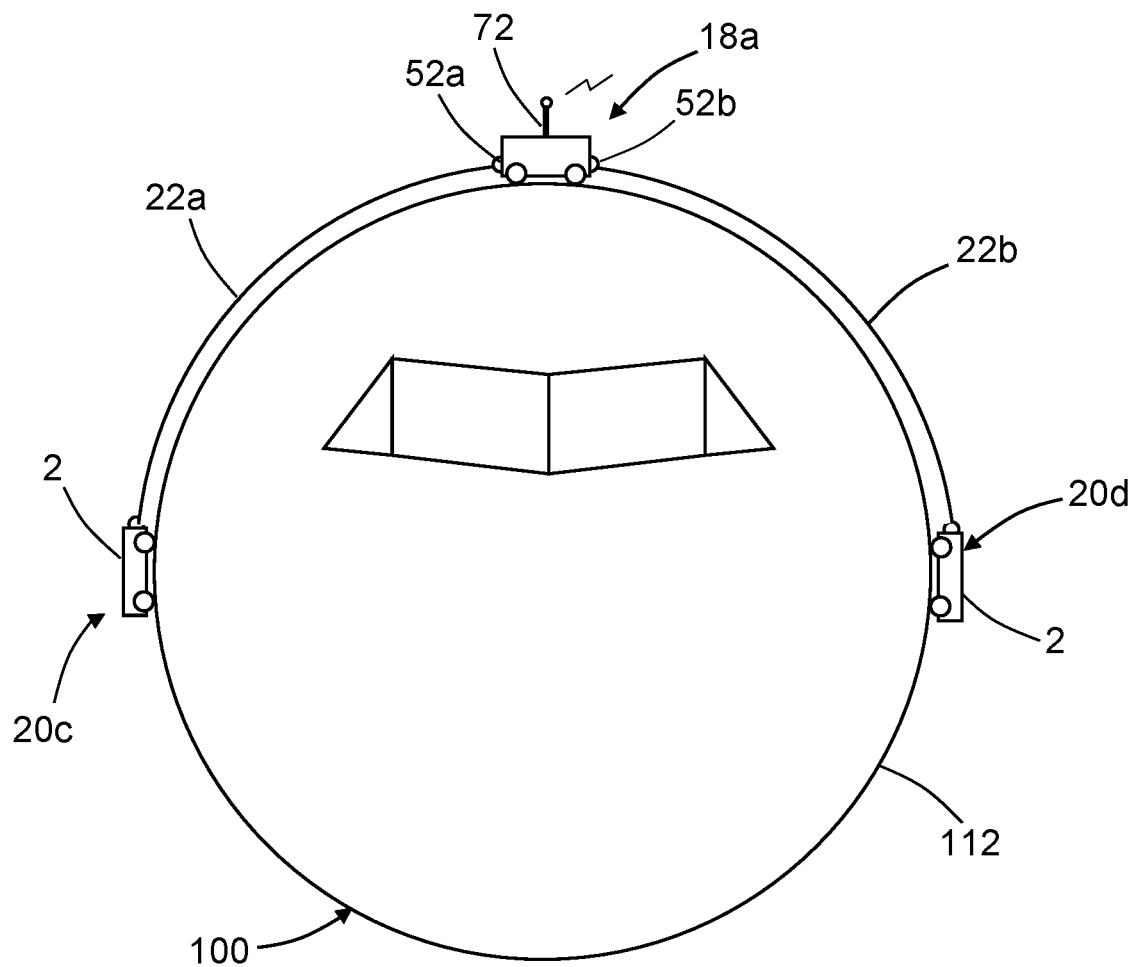
FIG. 16 is a diagram representing a front end view of an aircraft fuselage at an instant in time during an automated maintenance procedure performed using a gravity-compensating system that includes a cart equipped with a wireless communication system and a pair of vacuum-adhered, tool-equipped crawler vehicles connected to the cart by respective cables in accordance with a third embodiment.

FIG. 16 is a diagram representing a front end view of an aircraft fuselage 100 at an instant in time during an automated maintenance procedure performed using a gravity-compensating system in accordance with a third embodiment that includes a crawler vehicle 18a which is connected to a pair of tool-equipped crawler vehicles 20c and 20d by means of respective cables 22a and 22b. It should be appreciated that the cables 22a and 22b, which are depicted in FIG. 16 as being at a constant distance from the external surface 112, in actuality would contact the external surface 112 in an area midway between the crawler vehicles connected by the cable.

Still referring to FIG. 16, the crawler vehicle 18a is equipped with a pair of cable spools 52a and 52b for providing gravity compensation and a wireless communication system (including an antenna 72) for enabling two-way communication with a ground-based control computer (not shown in FIG. 16, but see control computer 90 in FIG. 17). The crawler vehicle further includes batteries (not shown in FIG. 16) for providing electrical power to itself and to the crawler vehicles 20c and 20d via respective power/signal cords attached to or incorporated in cables 22a and 22b. All of the crawler vehicles 18a, 20c and 20d may be configured to move holonomically. Such movements may be synchronized by the computer onboard the crawler vehicle 18a, which is configured to send operational instructions to the computers onboard the crawler vehicles 20c and 20d. In accordance with the arrangement depicted in FIG. 16, the computer onboard the crawler vehicle 18s also controls the motor-driven rotation of the respective cable spools 52a and 52b to concurrently apply additional gravity-compensating forces to the crawler vehicles 20 c and 20d via respective cables 22a and 22b in the manner described above.

FIG. 17 is a block diagram identifying some components of a system for performing an ultrasonic inspection on a surface of a body in accordance with one proposed computer architecture. For example, the NDI sensor unit may be an ultrasonic transducer array 88. As previously disclosed above, the system may include a control subsystem that uses rotation encoders to track the relative location (e.g., relative to an initial location acquired using a local positioning system) of the ultrasonic transducer array 88. More specifically, the control system includes a ground-based control computer 90 programmed with motion control application software 92 and NDI scan application software 94. The control computer 90 may be a general-purpose computer programmed with motion control application software 92 including respective software modules for sending instructions to the computers onboard the crawler vehicles 18a, 20c and 20d. Those onboard computers in turn output commands to the motor controllers onboard the crawler vehicles 18a, 20c and 20d, including: (a) two motor controllers onboard the crawler vehicle 18a that control operation of two onboard spool motors; and (b) at least four motor controllers on each crawler vehicle that control operation of the motors for coordinating movements of the crawler vehicles 18a, 20c and 20d along respective scan paths during an ultrasonic inspection. The motion control application software 92 sends commands based on feedback from a position measurement system 84 that tracks the locations of the crawler vehicles 18a, 20c and 20d. The feedback from the position measurement system 84 is also provided to an ultrasonic pulser/receiver 96, which may be connected to the ultrasonic transducer arrays 88 on crawler vehicles 20c and 20d via an electrical cord or cable or wirelessly.

Still referring to FIG. 17, the ultrasonic pulser/receiver 96 sends the encoder pulses to the NDI scan application software 94. The NDI scan application software 94 uses the encoder values to position the scan data in the proper location. The control computer 90 hosts ultrasonic data acquisition and display software that controls the ultrasonic pulser/receiver 96. The ultrasonic pulser/receiver 96 in turn sends pulses to and receives return signals from the ultrasonic transducer arrays 88. The NDI scan application software 94 controls all details of the scan data and the display of data, including the stitching of data acquired during adjacent sweeps of an ultrasonic transducer array 88.

The position measurement system 84 is configured to acquire position data representing the initial coordinate position of each of the crawler vehicles 20c and 20d relative to a coordinate system (i.e., frame of reference) of the aircraft fuselage 100. Once the initial coordinate position of each of the crawler vehicles 20c and 20d has been determined, the data acquired by the rotation encoders 48 (see FIG. 14A) can be used to track each incremental movement away or toward the initial coordinate positions. This enables the control computer 90 to track the positions of the ultrasonic transducer arrays 88 carried by the crawler vehicles 20c and 20d during ultrasonic inspection.

In accordance with an alternative embodiment, a cart having a multiplicity of vacuum adherence devices and a multiplicity of ball-and-socket bearings (such as the ball-and-socket bearings disclosed in U.S. Pat. Nos. 9,302,787 and 9,950,813 assigned to the assignee of the instant patent application) may be substituted for the holonomic-motion crawler vehicle 18a depicted in FIG. 16. In the alternative, rollers, casters or omni wheels could be employed.

Figure 18A:
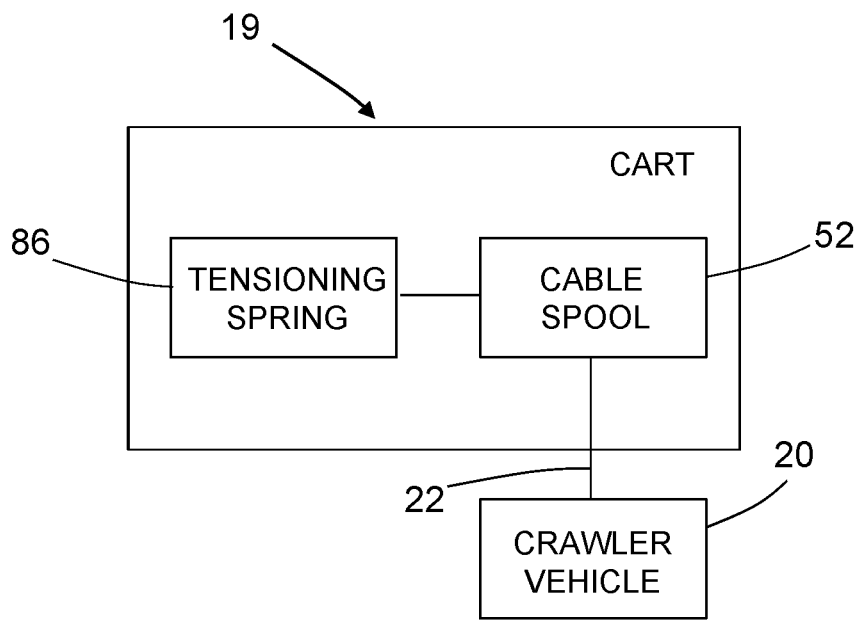
FIG. 18A is a block diagram identifying some components of a gravity-compensating system that includes a cart having a spring-driven cable spool that generates a tensile force to counteract a gravitational force being exerted on a moving cable-suspended crawler vehicle.

FIG. 18A is a block diagram identifying some components of a gravity-compensating system that includes a cart 19 having a cable spool 52 that is torqued by a constant-force tensioning spring 86. One end of cable 22 is attached to the cable spool 52; the other end of cable 22 is attached to the frame 2 of a crawler vehicle 20. In this example, the tensioning spring 86 generates a tensile force in the cable 22 to counteract a gravitational force being exerted on the crawler vehicle 20 as it moves.

Figure 18B:
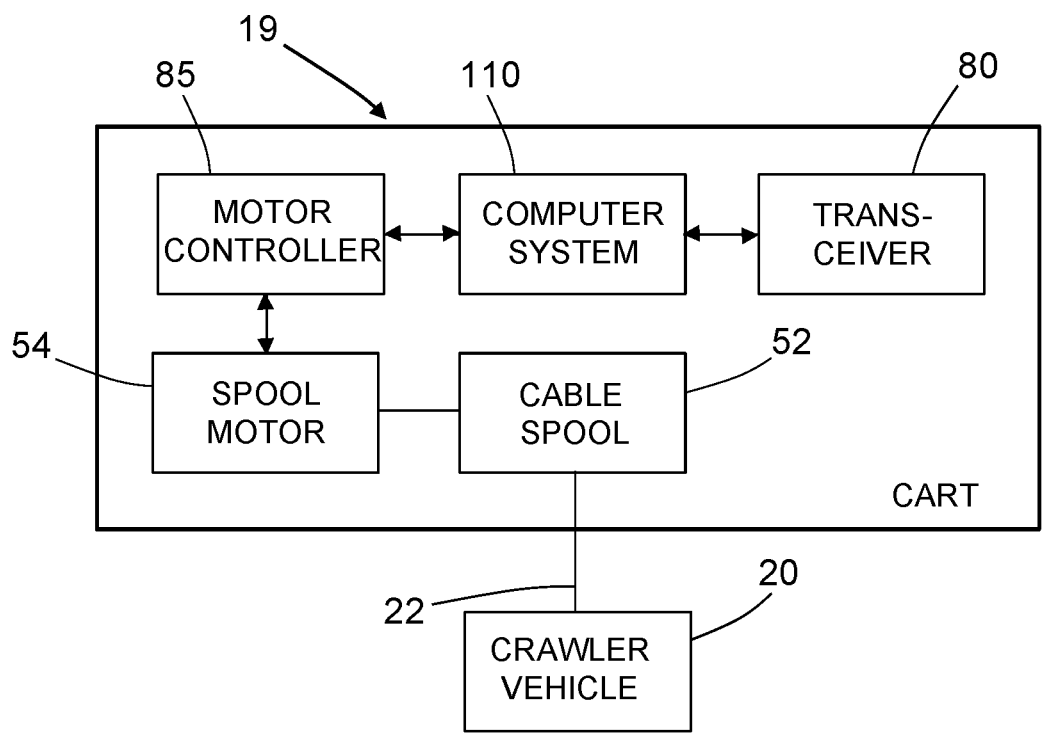
FIG. 18B is a block diagram identifying some components of a gravity-compensating system that includes a cart having a motor-driven cable spool that generates a tensile force to counteract a gravitational force being exerted on a moving cable-suspended crawler vehicle.

FIG. 18B is a block diagram identifying some components of a gravity-compensating system that includes a cart 19 having a cable spool 52 that is torqued by a spool motor 54. One end of cable 22 is attached to the cable spool 52; the other end of cable 22 is attached to the frame 2 of a crawler vehicle 20. In this example, the spool motor 54 is activated by the motor controller 85 to rotate in accordance with commands from a computer system 110 onboard the cart 19. The computer system 110 in turn receives operational instructions from a ground-based control computer via a transceiver 80 mounted to the cart 19. The controlled rotation of the spool motor 54 generates a tensile force in the cable 22 to counteract a gravitational force being exerted on the crawler vehicle 20 as it moves.

FIGS. 19A and 19B are diagrams representing front end views of an aircraft fuselage 100 at two different instants in time during an automated maintenance procedure performed using a gravity-compensating system in accordance with a fourth embodiment. The gravity-compensating system that includes an anchor device 74 attached to the external surface 112 and a tool-equipped crawler vehicle 20 vacuum adhered to the external surface 112. One end of cable 22 is attached to the cable spool 52; the other end of cable 22 is attached to the frame 2 of the crawler vehicle 20. The length of paid-out cable 22 shown In FIG. 19B is greater than the length of paid-out cable 22 shown In FIG. 19A. In this example, the cable spool 52 is rotated (by a tensioning spring or a spool motor) to generate a tensile force in the cable 22 to counteract a gravitational force being exerted on the crawler vehicle 20 as it moves. The anchor device 74 may be lowered into place by a crane (not shown in the drawings) that has an end effector which grips a handle 76 which is attached to the anchor base 75. The anchor base 75 may be attached to the external surface 112 using the same type of high-force static surface attachment device 77 as is depicted in FIGS. 20A and 20B, such as suction cups or an electro-adhesive gripper.

Figure 20A:
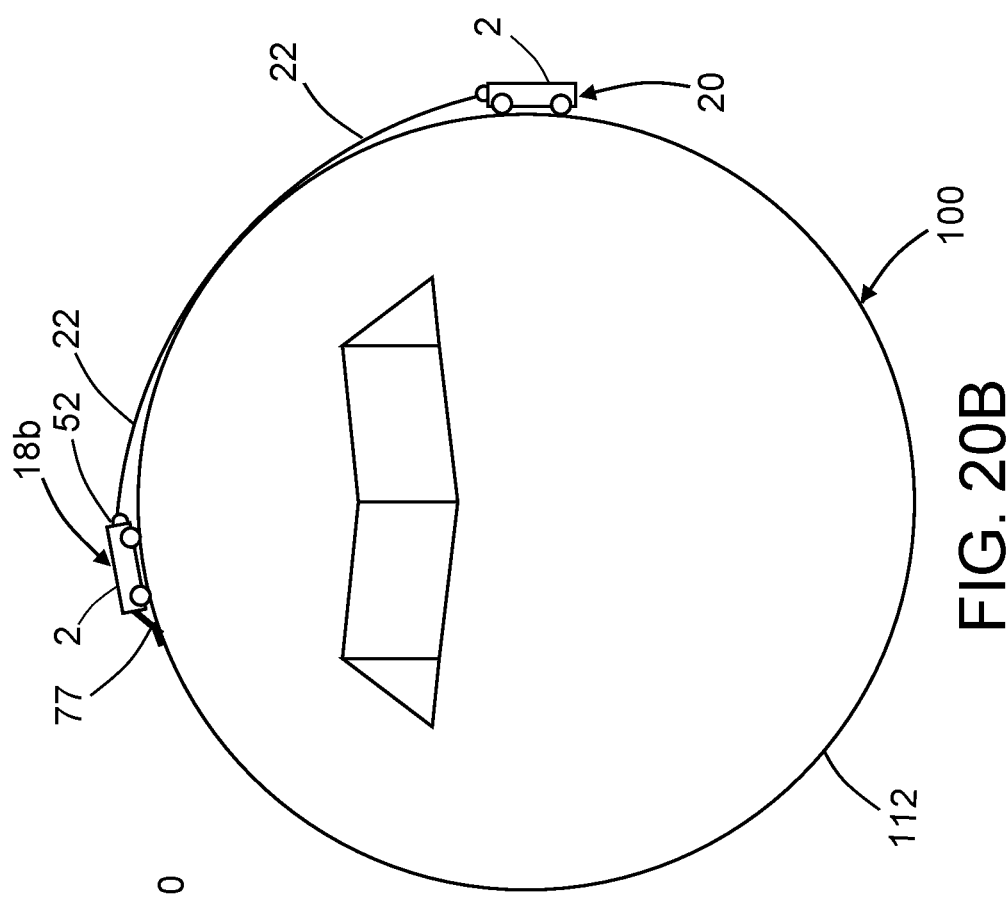
FIGS. 20A and 20B are diagrams representing front end views of an aircraft fuselage at two different instants in time during an automated maintenance procedure performed using a gravity-compensating system that includes a vacuum-adhered, tool-equipped crawler vehicle connected via a cable to a surface-attached crawler vehicle in accordance with a fifth embodiment. The length of paid-out cable shown In FIG. 20B is greater than the length of paid-out cable shown In FIG. 20A.
Figure 20B:
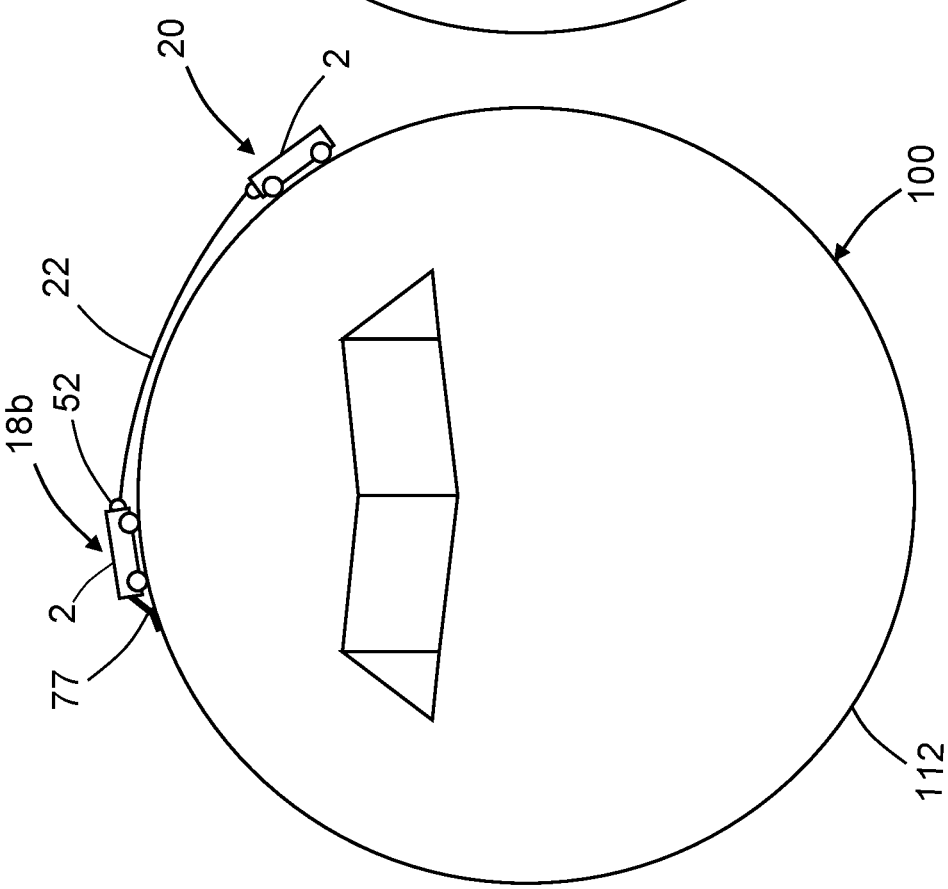

FIGS. 20A and 20B are diagrams representing front end views of an aircraft fuselage at two different instants in time during an automated maintenance procedure performed using a gravity-compensating system in accordance with a fifth embodiment. The gravity-compensating system includes a spool-equipped crawler vehicle 18b attached to the external surface 112 and a tool-equipped crawler vehicle 20 vacuum adhered to the external surface 112. One end of cable 22 is attached to the cable spool 52; the other end of cable 22 is attached to the frame 2 of the crawler vehicle 20. The length of paid-out cable 22 shown In FIG. 20B is greater than the length of paid-out cable 22 shown In FIG. 20A. The crawler vehicle 18b may be driven to a desired location and then attached to the external surface 112 using a high-force static surface attachment device 77, such as suction cups or an electro-adhesive gripper. Then the crawler vehicle 20 may be driven along a scan path. The cable spool 52 rotatably mounted to the frame 2 of the crawler vehicle 18b is rotated (by a tensioning spring or a spool motor) to generate a tensile force in the cable 22 to counteract a gravitational force being exerted on the crawler vehicle 20 as it scans an area on the external surface 112.

Figure 21:
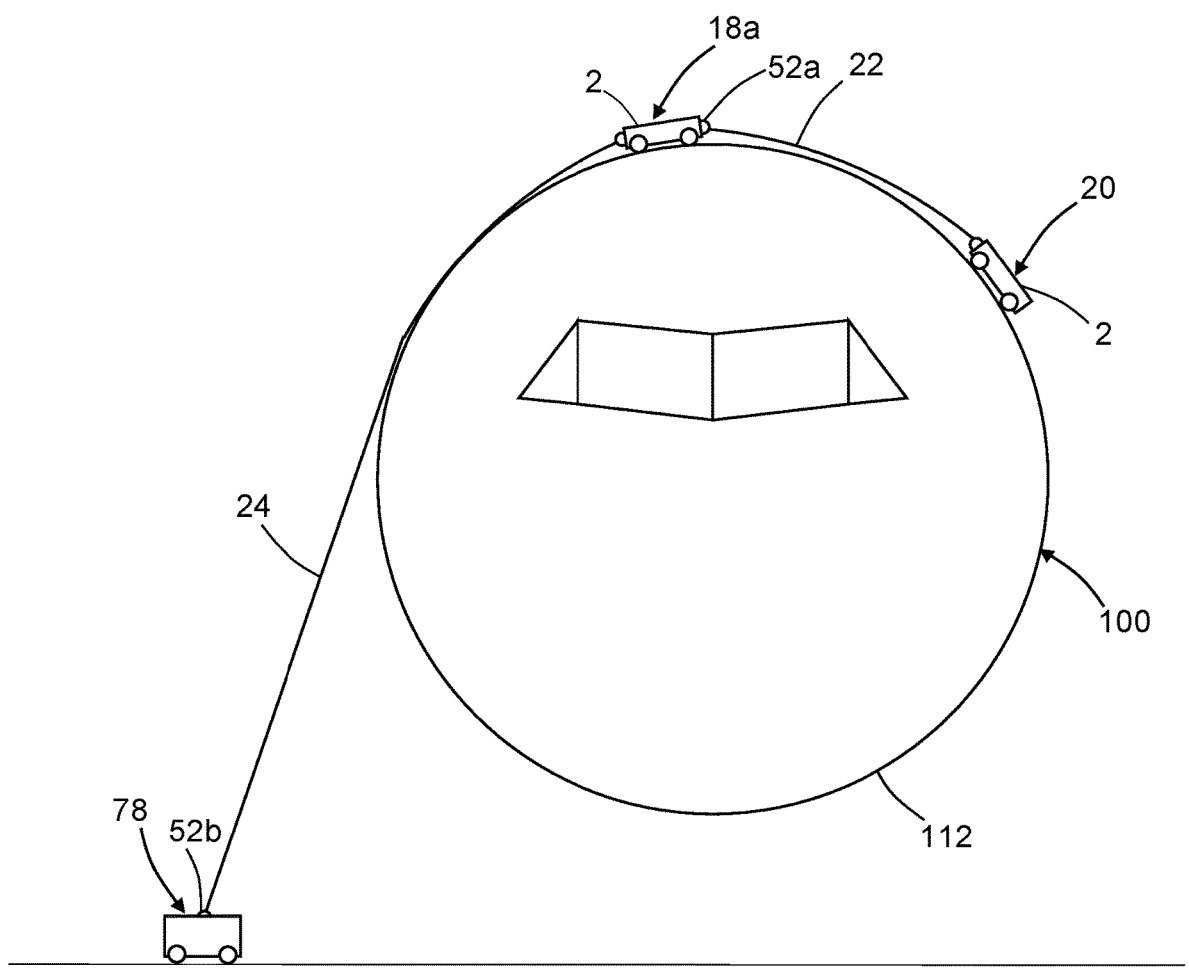
FIG. 21 is a diagram representing a front end view of an aircraft fuselage at an instant in time during an automated maintenance procedure performed using a gravity-compensating system that includes a spool-equipped ground vehicle, a vacuum-adhered spool-equipped crawler vehicle and a vacuum-adhered tool-equipped crawler vehicle connected by cables in accordance with a sixth embodiment.

FIG. 21 is a diagram representing a front end view of an aircraft fuselage 100 at an instant in time during an automated maintenance procedure performed using a gravity-compensating system in accordance with a sixth embodiment. The gravity-compensating system includes a ground vehicle 78 equipped with a cable spool 52b, a crawler vehicle 18a equipped with a cable spool 52a and connected to the ground vehicle 78 by an umbilical cable 24, and a crawler vehicle 20 equipped with a maintenance tool (not shown in FIG. 21) and connected to crawler vehicle 18a by a cable 22. The crawler vehicles 18a and 20 are both vacuum adhered to the external surface 112 of the aircraft fuselage 100. The crawler vehicles 18a and 20 may be configured to move holonomically. One end of umbilical cable 24 is attached to the cable spool 52b, while the other end of umbilical cable 24 is attached to the frame 2 of the crawler vehicle 18a; one end of cable 22 is attached to the cable spool 52a, while the other end of cable 22 is attached to the frame 2 of the crawler vehicle 20. The cable spool 52a rotatably mounted to the frame 2 of the crawler vehicle 18b is rotated (by a tensioning spring or a spool motor) to generate a tensile force in the cable 22 to counteract a gravitational force being exerted on the crawler vehicle 20 as it scans an area on the external surface 112.

Figure 22:
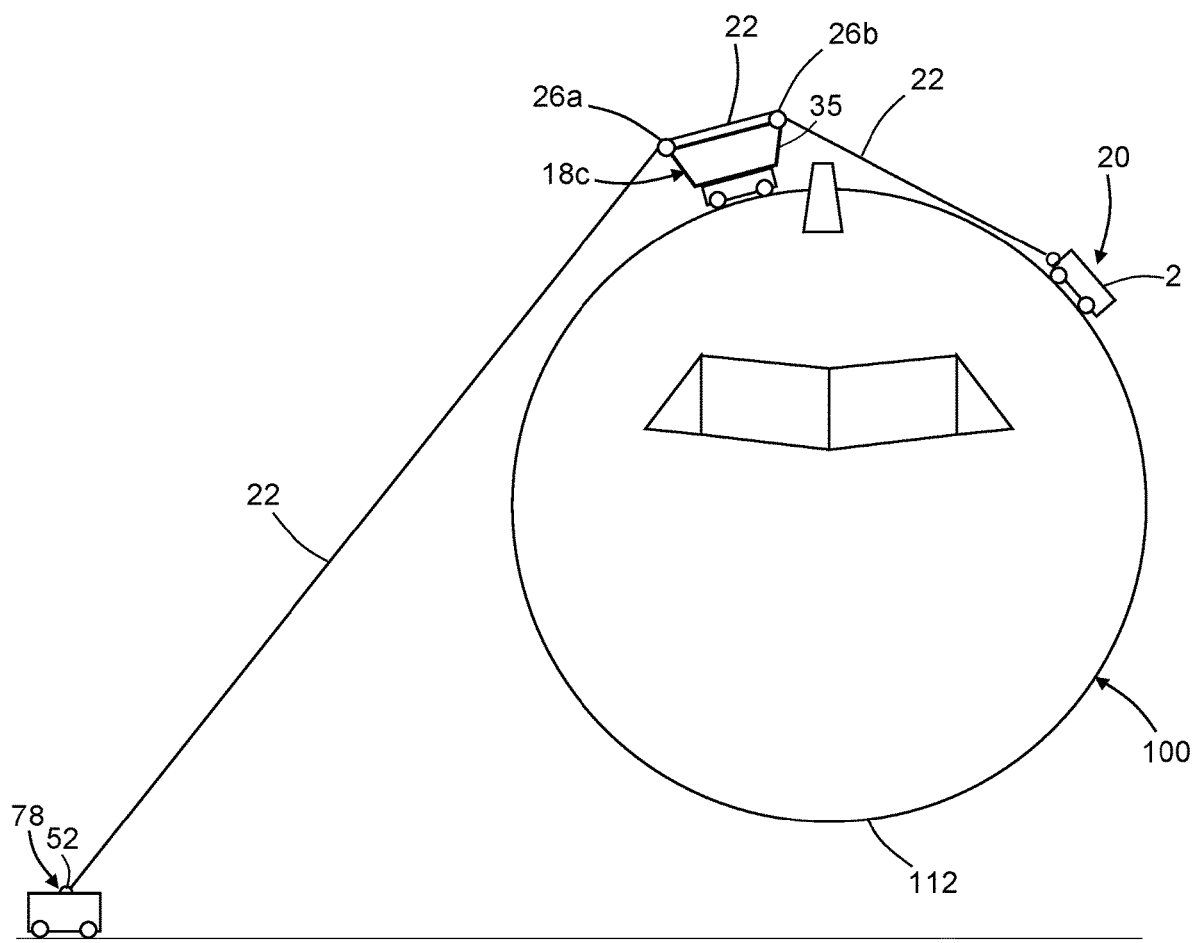
FIG. 22 is a diagram representing a front end view of an aircraft fuselage at an instant in time during an automated maintenance procedure performed using a gravity-compensating system that includes a spool-equipped ground vehicle and a tool-equipped crawler vehicle connected to the ground vehicle by a cable, and a cable-lifting crawler vehicle that supports an intermediate section of the cable in accordance with a seventh embodiment.

FIG. 22 is a diagram representing a front end view of an aircraft fuselage 100 at an instant in time during an automated maintenance procedure performed using a gravity-compensating system in accordance with a seventh embodiment. The gravity-compensating system includes a ground vehicle 78 equipped with a cable spool 52, a crawler vehicle 18c equipped with a pair of pulleys 26a and 26b, and a crawler vehicle 20 equipped with a maintenance tool (not shown in FIG. 22). In this embodiment, the frame 2 of the crawler vehicle 20 is connected to the cable spool 52a by means of a cable 22 which passes over the pulleys 26a and 26b. The crawler vehicles 18c and 20 are both vacuum adhered to the external surface 112 of the aircraft fuselage 100. The crawler vehicles 18c and 20 and ground vehicle 78 may be configured to move holonomically. The cable spool 52 rotatably mounted to the ground vehicle 78 is rotated (by a tensioning spring or a spool motor) to generate a tensile force in the cable 22 to counteract a gravitational force being exerted on the crawler vehicle 20 as it scans an area on the external surface 112. During such scanning, the pulleys 26a and 26b support the cable 22 at a distance from the external surface 112 so that the cable 22 neither contacts the external surface 112 nor snags on any obstacles protruding therefrom.

Additional embodiments of a gravity-compensating system for use with cable-suspended tool-equipped crawler vehicles will now be disclosed with reference to FIGS. 23 through 26. The systems respectively depicted in FIGS. 23-26 have some common features. To avoid repetitive description of common features, at least some common features will now be described. Thereafter respective distinctive features of each system will be separately described.

The gravity-compensating systems depicted in FIGS. 23-26 are designed for automated maintenance of a storage tank 106 having a horizontal flat top surface 128 and a vertical side surface 114 that surrounds the volume of space underneath the flat top surface 128 for the purpose of containing solid or liquid matter. The outer periphery of the horizontal flat top surface 128 of the storage tank 106 is circular and the vertical side surface 114 is circular cylindrical. Each of FIGS. 23-26 represents a view of a storage tank 106 at an instant in time during an automated maintenance procedure performed using gravity-compensating system in accordance with various embodiments.

Each of the systems depicted in FIGS. 23-26 includes a cable spool 52 supported by apparatus on the flat top surface 128, a cable 22 having one end attached to and a portion wrapped around the cable spool 52, and a crawler vehicle 20 vacuum adhered to the vertical side surface 114 of the storage tank 106 and attached to the other end of the cable 22. Preferably the crawler vehicle 20 is configured for holonomic motion. The crawler vehicle 20 includes a maintenance tool (not shown in FIGS. 23-26) for use in performing a maintenance operation on the vertical side surface 114. In each of the systems depicted in FIGS. 23-26, one end of cable 22 is attached to the cable spool 52, while the other end of cable 22 is attached to the frame 2 of the crawler vehicle 20. The cable spool 52 is positioned so that it projects radially outward beyond the vertical side surface 114 by a sufficient distance to prevent the paid-out portion of the cable 22 from contacting the vertical side surface 114.

In each of the situations depicted in FIGS. 23-26, the crawler vehicle 20 may be moved horizontally along the vertical side surface 114 during a scanning operation. For example, if crawler vehicle 20 were carrying an ultrasonic transducer array, then a stripe-shaped area of the vertical side surface 114 may be ultrasonically inspected along a scan path that is generally horizontal. As the crawler vehicle 20 moves sideways along the horizontal scan path, the crawler vehicle 20 circumnavigates the vertical side surface 114. The cable spool 52 rotates around a center of the horizontal flat top surface 128 as the crawler vehicle 20 circumnavigates the vertical side surface 114. In addition, the cable spool 52 is rotated (by a tensioning spring or a spool motor) to generate a tensile force in the cable 22 to counteract a gravitational force being exerted on the crawler vehicle 20 as the ultrasonic transducer array scans an area on the vertical side surface 114.

The only differences amongst the various embodiments depicted in FIGS. 23-26 are found in the respective components that support the cable spool 52. Those differences will now be described separately for each embodiment.

Figure 23:
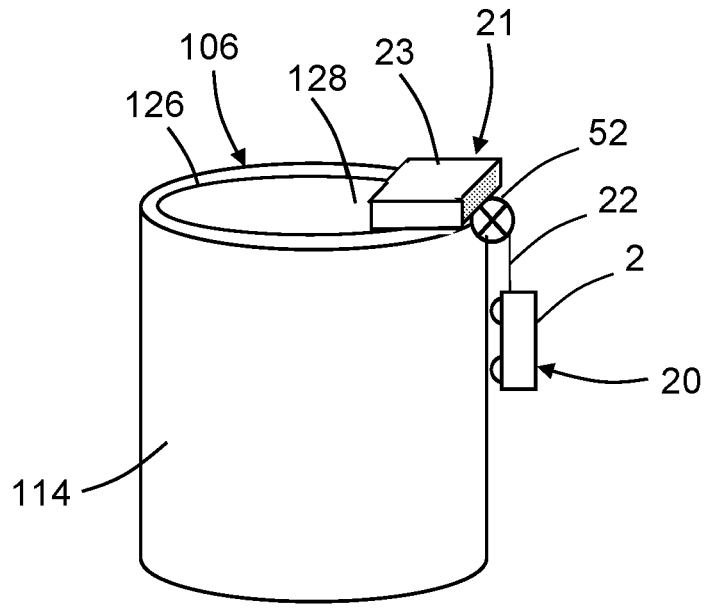
FIG. 23 is a diagram representing a view of a storage tank at an instant in time during an automated maintenance procedure performed using a gravity-compensating system that includes a spool-equipped lifting carriage that rides on a circular track placed on a top surface of the storage tank and a cable-suspended tool-equipped crawler vehicle vacuum adhered to a side surface of the storage tank in accordance with an eighth embodiment.

In the eighth embodiment depicted in FIG. 23, the components supporting the cable spool 52 include a lifting carriage 21 that rides on a circular track 126 placed on the horizontal flat top surface 128 of the storage tank 106. The circular track 126 is concentric with the circular outer periphery of the horizontal flat top surface 128. The cable spool 52 is rotatably mounted to a frame 23 of the lifting carriage 21. As the crawler vehicle 20 circumnavigates the vertical side surface 114 at a constant elevation, the lifting carriage 21 travels along the circular track 126 at the same angular speed, trying to maintain the cable 22 in a vertical position during scanning.

Figure 24:
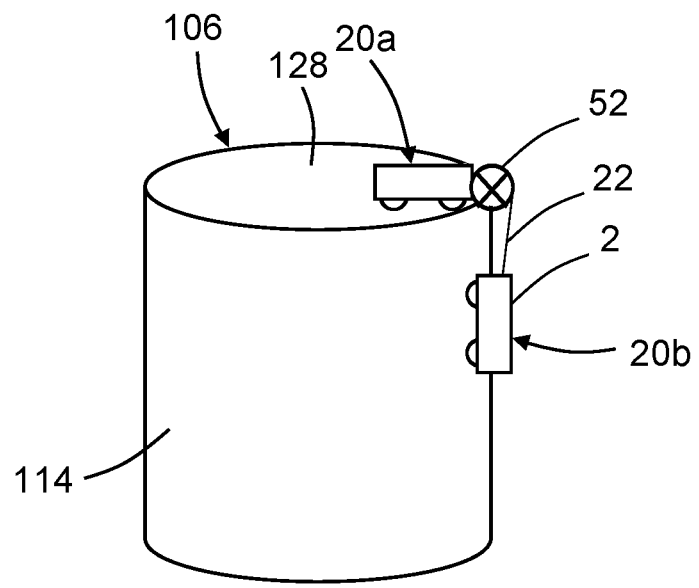
FIG. 24 is a diagram representing a view of a storage tank at an instant in time during an automated maintenance procedure performed using a gravity-compensating system that includes a spool-equipped crawler vehicle disposed on a top surface of the storage tank and a cable-suspended tool-equipped crawler vehicle vacuum adhered to a side surface of the storage tank in accordance with a ninth embodiment.

FIG. 24 is a diagram representing a view of a storage tank 106 at an instant in time during an automated maintenance procedure performed using a gravity-compensating system in accordance with a ninth embodiment. The gravity-compensating system includes a crawler vehicle 20a that is vacuum adhered to the horizontal flat top surface 128 of the storage tank 106 and a cable-suspended crawler vehicle 20b that is vacuum adhered to a vertical side surface 114 of the storage tank 106. Preferably the crawler vehicles 20a and 20b are configured for holonomic motion. The crawler vehicle 20a includes a frame 2 and a cable spool 52 rotatably mounted to the frame 2, while the crawler vehicle 20b includes a maintenance tool (not shown in FIG. 24) for use in performing a maintenance operation on the vertical side surface 114. One end of cable 22 is attached to the cable spool 52 on the crawler vehicle 20a, while the other end of cable 22 is attached to the frame 2 of the crawler vehicle 20b.

In the situation depicted in FIG. 24, the crawler vehicle 20b may be moved horizontally along the vertical side surface 114 during a scanning operation. As the crawler vehicle 20b moves sideways along a horizontal scan path, the crawler vehicle 20a rotates and translates in a manner that seeks to maintain the cable 22 in a vertical position during scanning. In effect, the crawler vehicle 20a rotates around a center of the horizontal flat top surface 128 at the same angular speed as the angular speed at which the crawler vehicle 20b circumnavigates the vertical side surface 114.

Figure 25:
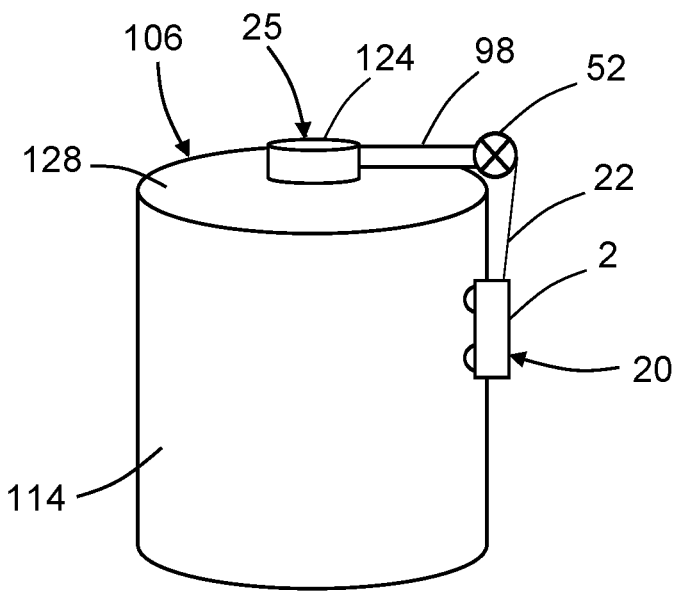
FIG. 25 is a diagram representing a view of a storage tank at an instant in time during an automated maintenance procedure performed using a gravity-compensating system that includes a passive turret-mounted spool-equipped arm rotatably coupled to a top surface of the storage tank and a cable-suspended tool-equipped crawler vehicle vacuum adhered to a side surface of the storage tank in accordance with a tenth embodiment.

FIG. 25 is a diagram representing a view of a storage tank 106 at an instant in time during an automated maintenance procedure performed using a gravity-compensating system in accordance with a tenth embodiment. The gravity-compensating system includes a passive anchor device 25 attached at a central position on the horizontal flat top surface 128 and a tool-equipped crawler vehicle 20 vacuum adhered to the vertical side surface 114. Preferably the crawler vehicle 20 is configured for holonomic motion. The anchor device 25 includes an anchor base (not shown in FIG. 25, but see anchor base 75a in FIG. 27) that may be attached to the flat top surface 128 using suction cups or an electroadhesive gripper. The anchor device 25 further includes a turret 124 that is rotatably coupled to the anchor base 75a, a pivot arm 98 having a proximal end connected to and extending radially outward from the turret 124, and a cable spool 52 rotatably mounted to a distal end of the pivot arm 98. The axis of rotation of the cable spool 52 may be perpendicular to the axis of rotation of the turret 124.

In the situation depicted in FIG. 25, as the crawler vehicle 20 circumnavigates the vertical side surface 114, the cable 22 pulls the cable spool 52 in a circumferential direction that causes the turret 124 and pivot arm 98 to follow the crawler vehicle 20. In effect, the pivot arm 98 rotates around a center of the horizontal flat top surface 128 at the same angular speed as the angular speed of the crawler vehicle 20, but with a slight lag due to a small angle by which the cable 22 deviates from a true vertical position.

Figure 26:
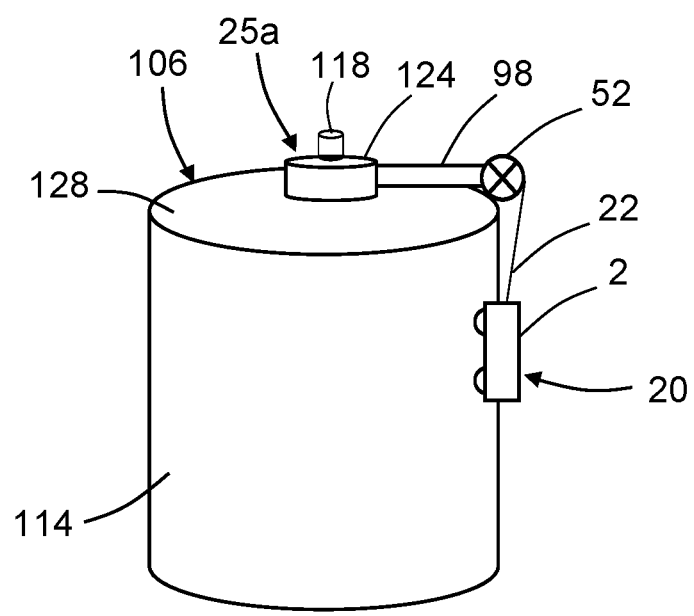
FIG. 26 is a diagram representing a view of a storage tank at an instant in time during an automated maintenance procedure performed using a gravity-compensating system that includes a motor-driven turret-mounted spool-equipped arm rotatably coupled to a top surface of the storage tank and a cable-suspended tool-equipped crawler vehicle vacuum adhered to a side surface of the storage tank in accordance with an eleventh embodiment.

FIG. 26 is a diagram representing a view of a storage tank 106 at an instant in time during an automated maintenance procedure performed using a gravity-compensating system in accordance with an eleventh embodiment. The gravity-compensating system includes a motorized anchor device 25a attached at a central position on the horizontal flat top surface 128 and a tool-equipped crawler vehicle 20 vacuum adhered to the vertical side surface 114. The motorized anchor device 25a includes an anchor base 75a (see FIG. 27) as previously described. The motorized anchor device 25a further includes a turret 124 that is rotatably coupled to the anchor base 75a, a pivot arm 98 extending radially outward from the turret 124, a cable spool 52 rotatably mounted to a distal end of the pivot arm 98, and an arm rotation motor 118. In the situation depicted in FIG. 26, the arm rotation motor 118 is activated to cause the turret 124 and pivot arm 98 to follow and rotate at the same angular speed as the angular speed at which the crawler vehicle 20 is circumnavigating the vertical side surface 114.

Figure 27:
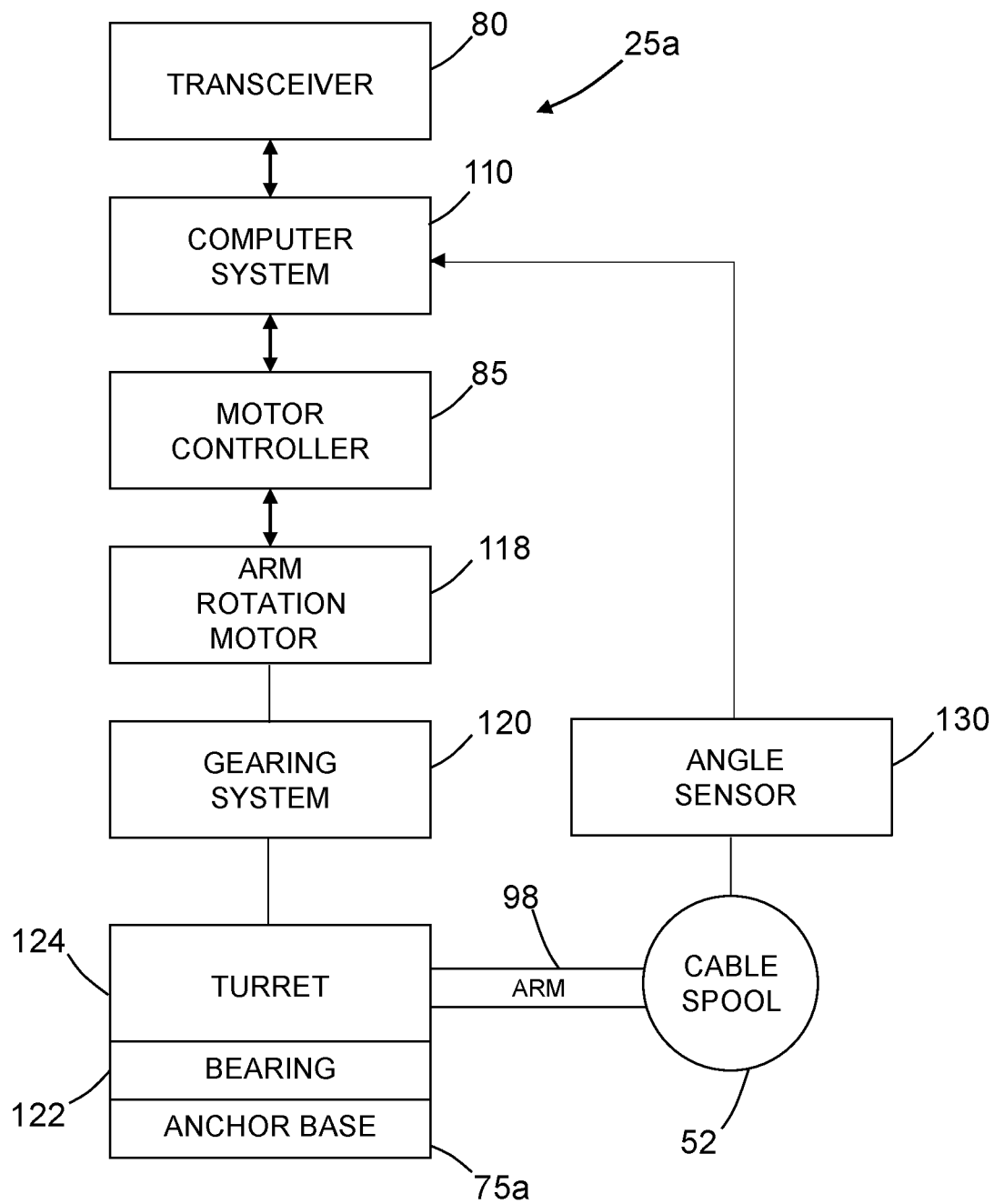
FIG. 27 is a block diagram identifying some of the components of the gravity-compensating system depicted in FIG. 26.

FIG. 27 is a block diagram identifying some of the components of the anchor device 25a depicted in FIG. 26. As previously mentioned, the anchor device 25a further includes an anchor base 75a, a turret 124 rotatably coupled to the anchor base 75a by means of a bearing 122, a pivot arm 98 extending radially outward from the turret 124, and a cable spool 52 rotatably mounted to a distal end of the pivot arm 98. The anchor device 25a further includes an arm rotation motor 118 mechanically coupled to the turret 124 by means of a gearing system 120. The arm rotation motor 118 operates under the control of one motor controller 85. The motor controller 85 in turn receives commands from a computer system 110 which may be incorporated in the anchor device 25a. The computer system 110 is also configured to control operation of the spool motor 54 (not shown in FIG. 27). The anchor device 25a further includes a transceiver 80 for receiving operational instructions from a ground-based control computer (not shown in FIG. 27).

In accordance with one proposed implementation, the cable spool 52 is rotatably coupled to the distal end of the pivot arm 98 by means of a second turret similar to turret 46 depicted in FIG. 4. More specifically, the spool axle 50 (see FIG. 14A) about which the cable spool 52 rotates is freely rotatable about an axis of the pivot arm 98. When the cable spool 52 is located directly over the crawler vehicle 20, the angle of the spool axle 50 is perpendicular to a vertical plane, meaning that the cable spool 52 is oriented vertically at an angle of 0° relative to a vertical plane. As the crawler vehicle 20 moves horizontally along the vertical side surface 114 and the pivot arm 98 is not rotating, however, the angle of the cable spool 52 will deviate from 0° relative to a vertical plane. The anchor device 25a further includes an angle sensor 130 (e.g., a rotation encoder) that detects this deviation from the 0° angular position. The output of the angle sensor 130 is output to the computer system 110, which then controls arm rotation motor 118 in a manner that seeks to restore the 0° angular position of the cable spool 52, in which situation the paid-out portion of the cable 22 would be vertical. In this manner, the pivot arm 98 may be controlled to rotate in a manner so that the cable spool 52 maintains a position directly above the circumnavigating crawler vehicle 20. In addition, the cable spool 52 is rotated (by a tensioning spring or a spool motor not shown in FIG. 27) to generate a tensile force in the cable 22 to counteract a gravitational force being exerted on the crawler vehicle 20 as the ultrasonic transducer array 88 (see FIG. 17) scans an area on the vertical side surface 114.

In each of the embodiments depicted in FIGS. 23-26, the length of the paid-portion of the cable 22 can be measured using another rotation encoder that is operatively coupled to the cable spool 52. This rotation encoder measures the angle of rotation of the cable spool 52 about the spool axle 50. Assuming that the elevation of the axis of rotation of the cable spool 52 about the spool axle 50 has been measured during initial setup of the system, the rotation encoder output will represent the length of the paid-portion of the cable 22, which in turn indicates the elevation of the point where the cable is attached to the frame 2 of the crawler vehicle 20. Because the geometry and dimensions of the crawler vehicle 20 are known, the computer system 110 may be configured to calculate the vertical position of the ultrasonic transducer array 88 in the frame of reference of the storage tank 106 based on the initial coordinates of the cable spool 52, the measured length of the paid-portion of the cable 22, and the known position of the ultrasonic transducer array 88 relative to the point of cable attachment.

Each of the lifting carriage 21 (depicted in FIG. 23), passive anchor device 25 (depicted in FIG. 25), and motorized anchor device 25a (depicted in FIG. 26) can utilize vacuum, electrostatic clamping, magnetic clamping, attachment to another structure, or even its own weight, to maintain positioning during operation. In addition, the lifting carriage, passive anchor device 25 or motorized anchor device 25a may lifted into position on the horizontal flat top surface 128 of the storage tank 106 by means of an unmanned aerial vehicle, crane or crawler or by manual means.

The automated apparatus disclosed herein can be adapted for use in the automation of various maintenance functions, including but not limited to non-destructive inspection, drilling, grinding, fastening, applique application, scarfing, ply mapping, marking, cleaning and painting. In cases where the end effector is a rotary tool (such as a scarfer, drill, deburrer or reamer), when the rotary tool reaches a target position, the computer system can be programmed to activate the end effector motor (not shown in drawings) via a motor controller to drive rotation of the rotary tool.

While apparatus and methods for providing gravity compensation for cable-suspended, vacuum-adhered, tool-equipped crawler vehicles moving on non-level surfaces have been described with reference to particular embodiments, it will be understood by those skilled in the art that various changes may be made and equivalents may be substituted for elements thereof without departing from the scope of the teachings herein. In addition, many modifications may be made to adapt a particular situation to the teachings herein without departing from the essential scope thereof. Therefore it is intended that the claims set forth hereinafter not be limited to the disclosed embodiments.

As used herein, the term "computer system" should be construed broadly to encompass a system having at least one computer or processor, and which may have multiple computers or processors that communicate through a network or bus. As used in the preceding sentence, the terms "computer" and "processor" both refer to devices comprising a processing unit (e.g., a central processing unit) and some form of memory (i.e., computer-readable medium) for storing a program which is readable by the processing unit.

The methods described herein may be encoded as executable instructions embodied in a non-transitory tangible computer-readable storage medium, including, without limitation, a storage device and/or a memory device. Such instructions, when executed by a processor or computer, cause the processor or computer to perform at least a portion of the methods described herein.

The method claims set forth hereinafter should not be construed to require that the steps recited therein be performed in alphabetical order (any alphabetical ordering in the claims is used solely for the purpose of referencing previously recited steps) or in the order in which they are recited unless the claim language explicitly specifies or states conditions indicating a particular order in which some or all of those steps are performed. Nor should the method claims be construed to exclude any portions of two or more steps being performed concurrently or alternatingly unless the claim language explicitly states a condition that precludes such an interpretation.

The invention claimed is:

1. A method for compensating for gravity during movement of a crawler vehicle on a surface of a body, the method comprising:
(a) attaching one end of a first cable to a first crawler vehicle;
(b) attaching another end of the first cable to a first spool of a second crawler vehicle;
(c) placing the first crawler vehicle at a first position in contact with a first surface area on the surface of the body, wherein the first surface area is non-level;
(d) placing the second crawler vehicle at a second position in contact with a second surface area on the surface of the body;
(e) adhering the first crawler vehicle to the surface of the body using suction;
(f) while the first crawler vehicle is adhered to the surface, moving the first crawler vehicle along a first path that extends from the first position to a third position in contact with a third surface area on the surface of the body; and
(g) tensioning the first cable to exert a tensile force on the first crawler vehicle having a vector component in opposition to a force of gravity tending to urge the first crawler vehicle to a lower elevation during step (f).

2. The method as recited in claim 1, further comprising operating a first maintenance tool of the first crawler vehicle to perform a maintenance operation on the surface at a point along the first path.

3. The method as recited in claim 1, further comprising attaching the second crawler vehicle to the surface at the second position by producing an attachment force having a magnitude sufficient to prevent detachment of the second crawler vehicle even when supporting an entire weight of the first crawler vehicle.

4. The method as recited in claim 3, wherein the attachment force is produced by one of the following forces: suction, electrostatic adhesion or magnetic attraction.

5. The method as recited in claim 3, wherein the attachment force is produced by suction.

6. The method as recited in claim 3, wherein the attachment force is produced by electrostatic adhesion.

7. The method as recited in claim 3, wherein the attachment force is produced by magnetic attraction.

8. The method as recited in claim 1, further comprising:
moving the second crawler vehicle along a second path while the first crawler vehicle is moving along the first path; and
operating a second maintenance tool of the second crawler vehicle to perform a maintenance operation on the surface at a point along the second path.

9. The method as recited in claim 1, wherein step (g) comprises winding a portion of the first cable on the first spool.

10. The method as recited in claim 9, wherein rotation of the first spool in a winding direction is motor-driven or spring-driven.

11. The method as recited in claim 9, wherein rotation of the first spool in a winding direction is motor-driven.

12. The method as recited in claim 9, wherein rotation of the first spool in a winding direction is spring-driven.

13. The method as recited in claim 1, further comprising:
(h) attaching one end of a second cable to a third crawler vehicle;
(i) attaching another end of the second cable to a second spool of the second crawler vehicle;
(j) placing the third crawler vehicle at a fourth position in contact with a fourth surface area on the surface of the body, wherein the fourth surface area is non-level;
(k) adhering the third crawler vehicle to the surface of the body using suction;
(l) while the third crawler vehicle is adhered to the surface, moving the third crawler vehicle along a second path that extends from the fourth position to a fifth position in contact with a fifth surface area on the surface of the body; and
(m) tensioning the second cable to exert a tensile force on the third crawler vehicle having a vector component in opposition to a force of gravity tending to urge the third crawler vehicle to a lower elevation during step (l).

14. The method as recited in claim 13, further comprising:
operating a first maintenance tool of the first crawler vehicle to perform a maintenance operation on the surface at a point along the first path; and
operating a second maintenance tool of the second crawler vehicle to perform a maintenance operation on the surface at a point along the second path.

15. The method as recited in claim 1, further comprising:
attaching one end of a second cable to a second spool of a ground vehicle;
attaching another end of the second cable to the second crawler vehicle; and
placing the ground vehicle in contact with a ground in proximity to the body,
wherein step (g) comprises winding a portion of the second cable on the second spool.

16. The method as recited in claim 1, wherein the body is an aircraft fuselage.

17. An apparatus comprising first and second crawler vehicles, a cable having one end connected to the first crawler vehicle and another end connected to the second crawler vehicle,
wherein the first crawler vehicle comprises: a first frame coupled to the one end of the cable; at least one vacuum adherence device attached to or integrated with the first frame; a first set of wheels rotatably coupled to the first frame; a first drive motor operatively coupled to drive rotation of at least one of the first set of wheels; a first maintenance tool coupled to the first frame and configured for performing a maintenance operation; and a first computer system configured to control operation of the first drive motor and the first maintenance tool, and
wherein the second crawler vehicle comprises: a second frame; at least one vacuum adherence device attached to or integrated with the second frame; a second set of wheels rotatably coupled to the second frame; a second drive motor operatively coupled to drive rotation of at least one of the second set of wheels; a cable spool to which the other end of the cable is attached; a spool motor mounted to the second frame and operatively coupled to drive rotation of the cable spool; and a second computer system configured to control operation of the second drive motor and the spool motor.

18. The apparatus as recited in claim 17, further comprising a control computer configured to generate control signals to be sent to the second computer system for selectively activating the spool motor to rotate the cable spool in a direction that winds the cable until a desired tensile force is exerted on the first crawler vehicle.

19. The apparatus as recited in claim 17, wherein the first and second crawler vehicles are configured for holonomic motion.

20. The apparatus as recited in claim 17, wherein the second crawler vehicle further comprises a second maintenance tool coupled to the second frame and configured for performing a maintenance operation, and the second computer system is further configured to control operation of the second maintenance tool.

21. The apparatus as recited in claim 17, wherein the first crawler vehicle comprises a first arm pivotably coupled to the first frame, the one end of the cable being coupled to the first arm, and the second crawler vehicle comprises a second arm pivotably coupled to the second frame, the cable spool being rotatably coupled to the second arm.

* * * * *